(12) United States Patent
Abubakar et al.

(10) Patent No.: US 10,752,740 B2
(45) Date of Patent: *Aug. 25, 2020

(54) ARTICLES COMPRISING BROAD MOLECULAR WEIGHT DISTRIBUTION POLYPROPYLENE RESINS

(71) Applicant: ExxonMobil Chemical Patents Inc., Baytown, TX (US)

(72) Inventors: Saifudin M. Abubakar, Shanghai (CN); Prasadarao Meka, Seabrook, TX (US); Stefan B. Ohlsson, Keerbergen (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/870,288

(22) Filed: Jan. 12, 2018

(65) Prior Publication Data

US 2018/0194911 A1 Jul. 12, 2018

Related U.S. Application Data

(63) Continuation of application No. 14/434,808, filed as application No. PCT/US2013/063763 on Oct. 8, 2013, now Pat. No. 9,902,822.

(Continued)

(51) Int. Cl.
*C08J 5/18* (2006.01)
*B29C 48/08* (2019.01)
(Continued)

(52) U.S. Cl.
CPC .............. *C08J 5/18* (2013.01); *B29C 48/022* (2019.02); *B29C 48/08* (2019.02); *B32B 27/08* (2013.01); *B32B 27/32* (2013.01); *B32B 27/327* (2013.01); *C08F 10/06* (2013.01); *B29C 48/0017* (2019.02); *B29K 2023/12* (2013.01); *B29K 2105/0085* (2013.01); *B29K 2105/0088* (2013.01); *B29K 2105/0094* (2013.01); *B29K 2995/0077* (2013.01); *B29L 2007/008* (2013.01); *B32B 2250/24* (2013.01); *B32B 2270/00* (2013.01); *B32B 2307/51* (2013.01); *B32B 2307/54* (2013.01); *B32B 2307/558* (2013.01); *B32B 2439/70* (2013.01);
(Continued)

(58) Field of Classification Search
CPC . C08J 5/18; C08F 10/06; C08F 210/06; C08F 210/14; C08F 110/06; B32B 27/327; B32B 27/32; B32B 27/08; B29C 47/0021; B29C 47/0004; B29C 47/0054
See application file for complete search history.

(56) References Cited

U.S. PATENT DOCUMENTS 5,752,362 A 5/1998 Eichbauer
5,907,942 A 6/1999 Eichbauer
(Continued)

FOREIGN PATENT DOCUMENTS

CN 102134290 B 12/2013
EP 0757069 B 2/1997
(Continued)

*Primary Examiner* — Prashant J Khatri
(74) *Attorney, Agent, or Firm* — Kevin M. Faulkner

(57) ABSTRACT

Disclosed herein are embodiments of films which comprise a polypropylene resin comprising at least 50 mol % propylene, an MWD (Mw/Mn) of greater than 5, and a branching index (g') of at least 0.95.

15 Claims, 1 Drawing Sheet g' Long Chain Branching of Polypropylene Resin

Related U.S. Application Data

(60) Provisional application No. 61/720,622, filed on Oct. 31, 2012.

(51) Int. Cl.

| | | |
|---|---|---|
| *B29C 48/00* | (2019.01) | |
| *B32B 27/08* | (2006.01) | |
| *B32B 27/32* | (2006.01) | |
| *C08F 10/06* | (2006.01) | |
| *B29K 105/00* | (2006.01) | |
| *B29K 23/00* | (2006.01) | |
| *B29L 7/00* | (2006.01) | |
| *C08F 110/06* | (2006.01) | |
| *C08F 210/06* | (2006.01) | |

(52) U.S. Cl.
CPC ........... *C08F 110/06* (2013.01); *C08F 210/06* (2013.01); *C08J 2323/12* (2013.01); *C08J 2327/12* (2013.01); *C08L 2314/02* (2013.01)

(56) References Cited

U.S. PATENT DOCUMENTS

| | | |
|---|---|---|
| 6,111,039 A | 8/2000 | Miro et al. |
| 6,602,598 B1 | 8/2003 | Simpson et al. |
| 9,453,093 B2 | 9/2016 | Meka et al. |
| 9,464,178 B2 | 10/2016 | Abubakar et al. |
| 2002/0006482 A1 | 1/2002 | Falla et al. |
| 2003/0088022 A1 | 5/2003 | Lin et al. |
| 2003/0118853 A1 | 6/2003 | Cook et al. |
| 2005/0159564 A1 | 7/2005 | Huovinen et al. |
| 2007/0054997 A1 | 3/2007 | Pierini et al. |
| 2008/0311368 A1 | 12/2008 | Tukachinsky |
| 2009/0030098 A1 | 1/2009 | Cagnani et al. |
| 2010/0168364 A1 | 7/2010 | Ernst et al. |
| 2012/0270039 A1 | 10/2012 | Tynys et al. |
| 2013/0023598 A1 | 1/2013 | Song et al. |

FOREIGN PATENT DOCUMENTS

| | | |
|---|---|---|
| EP | 2000504 A | 12/2008 |
| JP | 2011168789 A | 9/2011 |
| WO | WO98/44011 A | 10/1998 |
| WO | WO2007/130277 A | 11/2007 |
| WO | WO2010/034461 A | 4/2010 |
| WO | WO2011/088754 A | 7/2011 | g' Long Chain Branching of Polypropylene Resin

COMPLEX VISCOSITY OF PROPYLENE RESINS ary Ziegler-Natta polymerization are highly dependent on the stereoregularity of the polymer itself. Highly stereoregular polymers are generally crystalline, provide desirable high flexural moduli and are formed with a suitable choice of electron donor. These highly crystalline polymers also display high melting points, but innately exhibit low melt flow rates (MFR) that render them generally unsuitable for applications that require high processing rates, such as in injection molding, oriented films and thermobond fibers. Further, conventional polypropylene homopolymer and copolymer products formed from highly crystalline polypropylenes lack sufficient impact resistance for many uses. Polypropylene films are also subject to gelling issues, rendering them unsuitable for many film applications.

ARTICLES COMPRISING BROAD MOLECULAR WEIGHT DISTRIBUTION POLYPROPYLENE RESINS

CROSS-REFERENCE TO RELATED APPLICATION

This application is a Continuation of, and claims priority to, U.S. Ser. No. 14/434,808, filed Apr. 10, 2015, which claims the benefit of International Application No. PCT/US2013/063763 filed on Oct. 8, 2013, which claims priority to U.S. Ser. No. 61/720,622 filed Oct. 31, 2012, each of which is herein incorporated by reference.

FIELD OF INVENTION

Polypropylene resins and articles made therefrom.

BACKGROUND

Polypropylene is typically not suitable for use in producing various films. The physical properties of homopolymers of propylene formed by typical Ziegler-Natta polymerization are highly dependent on the stereoregularity of the polymer itself. Highly stereoregular polymers are generally crystalline, provide desirable high flexural moduli and are formed with a suitable choice of electron donor. These highly crystalline polymers also display high melting points, but innately exhibit low melt flow rates (MFR) that render them generally unsuitable for applications that require high processing rates, such as in injection molding, oriented films and thermobond fibers. Further, conventional polypropylene homopolymer and copolymer products formed from highly crystalline polypropylenes lack sufficient impact resistance for many uses. Polypropylene films are also subject to gelling issues, rendering them unsuitable for many film applications.

The polypropylene homopolymer or impact copolymer resins made from the traditional Ziegler-Natta catalyst based on phthalate or other aromatic containing internal electron donor systems, and a silane or diethers external electron donor, result in a molecular weight distribution (MWD) in the range of 3 to 4.5 and as such, have very low melt strength with no evidence of strain hardening under elongational extension in the melt. The resins with molecular weight distribution in the range of 3 to 4.5 are not suitable in converting processes such as blown film applications either in mono-layer or multi-layer applications due to poor melt strength. Similar behavior is observed in sheeting, deep-drawn thermoforming, and foaming applications. Other converting applications requiring good melt strength for which such polymers are not suitable include profile extrusion, base stock for thermoplastic vulcanizates (TPV), bi-axially oriented polypropylene (BOPP) film, blow molding applications, and the like.

There is a need in the art for polypropylene resins having one or more properties such as improved melt strength, improved stiffness, and the like. There is also a need for such polypropylene resins suitable for use in blown film, in multi-layer applications as replacement for HDPE, sheeting, thermoforming in shallow drawn and deep drawn applications, and/or foaming applications.

Related references include EP 0 757 069 A1; EP 2 000 504 A1; US 2003-088022; US 2007-054997; US 2008-311368; U.S. Pat. Nos. 6,602,598; 5,907,942; US 2003-118853; U.S. Pat. No. 5,752,362; WO 2007/130277; WO 98/44011; and WO 2010/034461.

SUMMARY

In embodiments according to the instant disclosure, a film comprises a polypropylene resin, wherein the polypropylene resin comprises at least 50 mol % propylene, an MWD (Mw/Mn) greater than 5, a branching index (g') of at least 0.95, and a melt strength greater than 20 cN determined using an extensional rheometer at 190° C., wherein the film is an extruded blown film, a cast film, or a combination thereof.

This summary is provided to introduce a selection of concepts that are further described below in the detailed description. This summary is not intended to identify key or essential features of the claimed subject matter, nor is it intended to be used as an aid in limiting the scope of the claimed subject matter. Other and further objects, advantages and features of the present invention will be understood by reference to claims which follow this specification.

DETAILED DESCRIPTION

Figure 1:
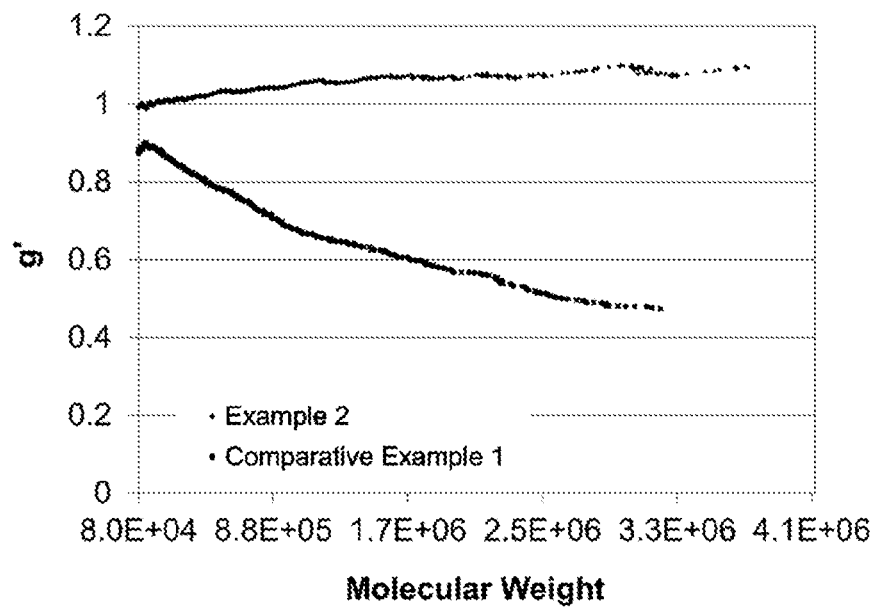
FIG. 1 is a graph plotting the intrinsic viscosity vs. molecular weight of a propylene resin produced according to the instant disclosure.

In situ polymerized materials (e.g., polypropylene) with improved melt strength, MWD, and high MFRs can be produced in a single stage polymerization conducted in the presence of certain Ziegler-Natta catalysts, a non-aromatic internal electron donor, and a blend of two external electron donors. The resulting polypropylene resin may have a melt strength of at least 20 cN or at least 30 cN determined using an extensional rheometer at 190° C., a branching index (g') of at least 0.95, and an MWD (Mw/Mn) of greater than 5. The Ziegler-Natta catalyst system may comprise a Ziegler-Natta catalyst comprising a non-aromatic internal electron donor, and first and second external electron donors comprising different organosilicon compounds. The first external electron donor may have the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms. The second external electron donor may have the formula $R^3{}_nSi(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor.

In any embodiment, a film may comprise a polypropylene resin having an MWD (Mw/Mn) greater than 5, a branching index (g') of at least 0.95, and a melt strength greater than 20 cN determined using an extensional rheometer at 190° C., wherein the film is an extruded blown film, a cast film, or a combination thereof; and/or wherein the MWD is from 6 to 15 and an MFR from 0.1 to 100, determined according to ASTM D1238 Condition L; and/or, wherein the melt strength is from 50 cN to 200 cN; and/or wherein the polypropylene resin has a viscosity ratio of from 35 to 80 determined from the complex viscosity ratio at 0.01 to 100 rad/s angular frequency at a fixed strain of 10% at 190° C.; and/or wherein the polypropylene resin has a heat distortion temperature of greater than or equal to 100° C., determined according to ASTM D648 using a load of 0.45 MPa (66 psi); and/or wherein the polypropylene resin is an impact copolymer; and/or wherein the polypropylene resin comprises from 0.1 to 10 mol % of a comonomer selected from the group consisting of ethylene and $C_4$ to $C_{20}$ olefins; and/or wherein the polypropylene resin comprises an isopentad percentage of greater than 95%; and/or wherein the polypropylene resin has a stiffness of from 2000 MPa (290 kpsi) to 2500 MPa (360 kpsi) determined according to ASTM D790A on samples nucleated with 0.1% sodium benzoate; and/or wherein the film further comprises greater than or equal to 0.01 wt % of one or more additives selected from the group consisting of: reinforcing fillers; non-reinforcing fillers; scratch resistant agents; plasticizers; antioxidants; phosphites; anti-cling additives; tackifiers; UV stabilizers; heat stabilizers; anti-blocking agents; release agents; anti-static agents; pigments; colorants; dyes; waxes; silica; extender oils; lubricants; talc; anti-fogging agents; foaming agents; flame/fire retardants; blowing agents; vulcanizing agents; curative agents; vulcanizing accelerators; curative accelerators; cure retarders; processing aids; tackifying resins; and a combination thereof; and/or wherein the polypropylene resin is produced by contacting propylene monomers at propylene polymerization conditions with a catalyst system comprising a Ziegler-Natta catalyst comprising a non-aromatic internal electron donor, and first and second external electron donors comprising different organosilicon compounds; and/or wherein the film is characterized by containing less than 1 total gel having a size of 1 micron or larger, wherein the gel content is determined by optical microscopy at 8× magnification of a 5 cm square of a blown film having a thickness of 38.1 microns (1.5 mils); and/or wherein the film is a multilayer film; and/or wherein the film has a 10% offset yield stress MD determined according to ASTM D882 of greater than 15 MPa, and a 10% offset yield stress TD determined according to ASTM D882 of greater than 15 MPa, for a 40 micron film; and/or having an elongation at yield in the machine direction (MD) determined according to ASTM D882 of greater than 5% and an elongation at yield in the transverse direction (TD) determined according to ASTM D882 of greater than 5% for a 40 micron film; and/or having a stress at yield MD determined according to ASTM D882 of greater than 18 MPa, and a stress at yield TD determined according to ASTM D882 of greater than 18 MPa for a 40 micron film; and/or having a tensile strength at break MD determined according to ASTM D882 of greater than 60 MPa, and a tensile strength at break TD determined according to ASTM D882 of greater than 60 MPa for a 40 micron film; and/or having an elongation at break MD determined according to ASTM D882 of greater than 650%, and an elongation at break TD determined according to ASTM D882 of greater than 650%, for a 40 micron film; and/or having an energy at break MD determined according to ASTM D882 of greater than 200 mJ/mm³ and an energy at break TD determined according to ASTM D882 of greater than 200 mJ/mm³, for a 40 micron film; and/or having a 1% secant modulus MD determined according to ASTM D882 of greater than 550 MPa, and a 1% secant modulus TD determined according to ASTM D882 of greater than 550 MPa for a 40 micron film; and/or having a two point bending stiffness bending modulus at 10°-25° of greater than or equal to 350 MPa, using a 40 micron film determined according to DIN 53121; and/or having a two point bending stiffness bending modulus at 10°-25° of greater than or equal to 550 MPa, using an 80 micron film determined according to DIN 53121; and/or having a two point bending stiffness of greater than or equal to 1.6 mN-mm, determined using a 40 micron film according to DIN 53121; and/or having a two point bending stiffness of greater than or equal to 20 mN-mm, determined using an 80 micron film according to DIN 53121; and/or having a dart impact AF50% of greater than 6.1 g/μm according to ASTM D1709; and/or having an Elmendorf tear strength in the machine direction (MD) of greater than 2.0 g/μm for a 40 micron film, greater than 4.5 g/μm for an 80 micron film an Elmendorf tear strength TD of greater than 13.5 g/μm for a 40 micron film, greater than 13.5 g/μm for an 80 micron film, or a combination thereof, when determined according to ASTM-D1922; and/or wherein a layer comprising the polypropylene resin is disposed between a top outer layer and a bottom outer layer; and/or the film comprising greater than or equal to 20 wt % propylene, based on the total weight of the film; and/or wherein a layer of the film comprises greater than or equal to 20 wt % of the polypropylene resin, based on the total weight of the layer of the film.

In any embodiment, a method of making a film may comprise (i) extruding a film through a die; (ii) cooling/quenching the film; and (iii) orienting the film in the machine direction, wherein the film comprises a polypropylene resin comprising at least 50 mol % propylene, an MWD (Mw/Mn) greater than 5, a branching index (g') of at least 0.95, and a melt strength greater than 20 cN determined using an extensional rheometer at 190° C., and wherein the film comprises greater than or equal to 20 wt % propylene, based on the total weight of the film; and/or wherein the method further comprises downgauging the film by from 5 wt % to 10 wt %; and/or wherein at least one layer of the film comprises greater than or equal to 20 wt % of the propylene resin, based on the total weight of the layer of the film; and/or wherein the polypropylene resin is produced by contacting propylene monomers at propylene polymerization conditions with a catalyst system comprising a Ziegler-Natta catalyst comprising a non-aromatic internal electron donor, and first and second external electron donors comprising different organosilicon compounds; and/or wherein the MWD is from 6 to 15, the melt strength is from 50 cN to 200 cN and wherein the polypropylene resin has one or a combination of the following properties: (1) a viscosity ratio of from 35 to 80 determined from the complex viscosity ratio at 0.01 to 100 rad/s angular frequency at a fixed strain of 10% at 190° C.; (2) a heat distortion temperature of greater than or equal to 100° C., determined according to ASTM D648 using a load of 0.45 MPa (66 psi); (3) an isopentad percentage of greater than 95%; (4) an MFR from 0.1 to 100, determined according to ASTM D1238 Condition L; and (5) a stiffness of from 2000 MPa (290 kpsi) to 2500 MPa (360 kpsi) determined according to ASTM D790A on samples nucleated with 0.1% sodium benzoate; and/or wherein the film is characterized by: containing less than 1 total gel having a size of 1 micron or larger, wherein the gel content is determined by optical microscopy at 8× magnification of a 5 cm square of a blown film having a thickness of 38.1 microns (1.5 mils); a 10% offset yield stress MD determined according to ASTM D882 of greater than 15 MPa, and a 10% offset yield stress TD determined according to ASTM D882 of greater than 15 MPa for a 40 micron film thickness; an elongation at yield MD determined according to ASTM D882 of greater than 5% and an elongation at yield TD determined according to ASTM D882 of greater than 5% for a 40 micron film thickness; a stress at yield MD determined according to ASTM D882 of greater than 18 MPa, and a stress at yield TD determined according to ASTM D882 of greater than 18 MPa for a 40 micron film thickness; a tensile strength at break MD determined according to ASTM D882 of greater than 60 MPa, and a tensile strength at break TD determined according to ASTM D882 of greater than 60 MPa for a 40 micron film thickness; an elongation at break MD determined according to ASTM D882 of greater than 650%, and an elongation at break TD determined according to ASTM D882 of greater than 650% for a 40 micron film thickness; an energy at break MD determined according to ASTM D882 of greater than 200 mJ/mm$^3$ and an energy at break TD determined according to ASTM D882 of greater than 200 mJ/mm$^3$, for a 40 micron film thickness; a 1% secant modulus MD determined according to ASTM D882 of greater than 550 MPa, and a 1% secant modulus TD determined according to ASTM D882 of greater than 550 MPa for a 40 micron film thickness; a normalized two point bending stiffness force at 30° of greater than or equal to 3.4 mN/μm, determined according to DIN 53121; a two point bending stiffness bending modulus at 10°-25° of greater than or equal to 350 MPa, using a 40 micron film determined according to DIN 53121; a two point bending stiffness bending modulus at 10°-25° of greater than or equal to 550 MPa, using an 80 micron film determined according to DIN 53121; a two point bending stiffness of greater than or equal to 1.6 mN-mm, determined using a 40 micron film according to DIN 53121; a two point bending stiffness of greater than or equal to 20 mN-mm, determined using an 80 micron film according to DIN 53121; a dart impact AF50% of greater than 6.1 g/μm according to ASTM D1709; an Elmendorf tear strength in the machine direction (MD) of greater than 2.0 g/μm for a 40 micron film, greater than 4.5 g/μm for an 80 micron film, an Elmendorf tear strength in the transverse direction (TD) of greater than 13.5 g/μm for a 40 micron film, greater than 13.5 g/μm for an 80 micron film, or a combination thereof, when determined according to ASTM-D1922; or a combination thereof.

In any embodiment, a multilayer blown film may comprise skin layers each comprising a metallocene polyethylene (mPE) comprising a copolymer derived from ethylene and one or more $C_3$ to $C_{20}$ alpha-olefin comonomers, wherein the copolymer has a density from 0.910 to 0.930 g/cm$^3$, a melt index (MI), $I_{2.16}$, from 0.1 to 15, a molecular weight distribution (MWD) from 2.5 to 5.5, and melt index ratio (MIR), $I_{21.6}/I_{2.16}$, from 15 to 25 (low-MIR mPE) or from greater than 25 to 80 (high-MIR mPE); at least one sublayer comprising mPE; and at least one sublayer comprising a broad molecular weight polypropylene resin (BMWPP), wherein the broad molecular weight polypropylene resin has an MWD (Mw/Mn) greater than 5, a branching index (g') of at least 0.95, and a melt strength greater than 20 cN determined using an extensional rheometer at 190° C.; and/or wherein the skin layers independently comprise low-MIR mPE, high-MIR mPE, or a combination thereof; and/or wherein the sublayer mPE comprises low-MIR mPE, high-MIR mPE, or a combination thereof; and/or wherein the at least one mPE sublayer comprises at least one pair of intermediate layers on opposite sides of a core sublayer comprising the at least one sublayer comprising the BMWPP or a combination thereof; and/or wherein the intermediate sublayers are from 0.5 to 2 times as thick as one of the skin layers and wherein the core sublayer is from 0.5 to 6 times as thick as one of the intermediate layers; and/or wherein the at least one sublayer comprising the BMWPP comprises at least one pair of intermediate layers on opposite sides of a core sublayer comprising the at least one mPE sublayer; and/or wherein the intermediate sublayers are from 0.5 to 2 times as thick as one of the skin layers and wherein the core sublayer is from 0.5 to 6 times as thick as one of the intermediate layers; and/or wherein: the skin layers independently comprise the low-MIR mPE; the sublayer mPE comprises high-MIR mPE; the at least one mPE sublayer comprises a pair of intermediate layers on opposite sides of a core sublayer comprising the at least one sublayer comprising BMWPP; and the core sublayer comprises LDPE; and/or wherein the skin layers further comprise up to 95 percent by weight of another polymer selected from the group consisting of: LDPE, DPE and combinations thereof; and/or wherein: the skin layers independently comprise the low-MIR mPE; the sublayer mPE comprises high-MIR mPE; and the at least one mPE sublayer comprises a pair of intermediate layers on opposite sides of a core sublayer comprising the at least one sublayer comprising BMWPP; and/or wherein the skin layers comprise up to 80 percent by weight of another polymer selected from the group consisting of BMWPP, HDPE, LDPE and combinations thereof, and wherein the core sublayer comprises BMWPP and LDPE at a ratio from 1:10 to 10:1 by weight; and/or wherein: the skin layers independently comprise the low-MIR mPE, the high-MIR mPE or a combination thereof; the sublayer mPE comprises the low-MIR mPE, the high-MIR mPE or a combination thereof; the at least one sublayer comprising BMWPP comprises a pair of intermediate layers on opposite sides of a core sublayer comprising the mPE sublayer; and the intermediate layers comprise BMWPP; and/or wherein the skin layer mPE comprises the high-MIR mPE and wherein the sublayer mPE comprises the low-MIR mPE; and/or wherein: the skin layers independently comprise the low-MIR mPE and the high-MIR mPE at a ratio from 1:10 to 10:1 by weight; the sublayer mPE comprises the high-MIR mPE; and the at least one pair of intermediate sublayers comprise BMWPP; and/or wherein at least one of the sublayers further comprise up to 90 percent by weight of a propylene based polymer other than BMWPP; and/or wherein the propylene based polymer other than BMWPP comprises a propylene based elastomer; and/or wherein the film comprises greater than or equal to 20 wt % polypropylene, based on the total weight of the film; and/or wherein the film comprises greater than or equal to 20 wt % of the broad molecular weight polypropylene resin, based on the total weight of the film; and/or wherein at least one layer comprises greater than or equal to 20 wt % of the broad molecular weight polypropylene resin, based on the total weight of the layer of the film.

The term "polypropylene" or a "propylene polymer" is a polymer having at least 50 mol % of propylene. As used herein, Mn is number average molecular weight as determined by proton nuclear magnetic resonance spectroscopy ($^1$H NMR) or by gel permeation chromatography (GPC) unless stated otherwise, Mw is weight average molecular weight determined by gel permeation chromatography (GPC), and Mz is z average molecular weight determined by GPC, wt % is weight percent, and mol % is mole percent. Molecular weight distribution (MWD) is defined to be Mw divided by Mn. Unless otherwise noted, all molecular weight units, e.g., Mw, Mn, Mz, are g/mol. All percentages are in weight percent (wt %) unless otherwise specified. For purposes herein, Mw, Mz number of carbon atoms, g value and g'$_{vis}$ may be determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001) and references therein. Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, 13C-NMR Method (Academic Press, New York, 1977).

Ziegler-Natta Catalysts

Ziegler-Natta catalysts suitable for use herein include solid titanium supported catalyst systems described in U.S. Pat. Nos. 4,990,479 and 5,159,021, and PCT WO00/63261. The Ziegler-Natta catalyst can be obtained by: (1) suspending a dialkoxy magnesium compound in an aromatic hydrocarbon that is liquid at ambient temperatures; (2) contacting the dialkoxy magnesium-hydrocarbon composition with a titanium halide and with a diester of an aromatic dicarboxylic acid; and (3) contacting the resulting functionalized dialkoxy magnesium-hydrocarbon composition of step (2) with additional titanium halide.

The catalyst system may be a solid titanium catalyst component comprising magnesium, titanium, halogen a non-aromatic internal electron donor and two or more external electron donors. The solid titanium catalyst component, also referred to as a Ziegler-Natta catalyst, can be prepared by contacting a magnesium compound, a titanium compound and at least the internal electron donor. Examples of the titanium compound used in the preparation of the catalyst include tetravalent titanium compounds having the formula $Ti(OR_n)X_{4-n}$, wherein R is a hydrocarbyl radical, X is a halogen atom, and n is from 0 to 4.

In any embodiment suitable titanium compounds for use herein include titanium tetra-halides such as $TiCl_4$, $TiBr_4$ and/or $TiI_4$; alkoxy titanium trihalides including $Ti(OCH_3)Cl_3$, $Ti(OC_2H_5)Cl_3$, $Ti(O\ n\text{-}C_4H_9)Cl_3$, $Ti(OC_2H_5)Br_3$, and/or $Ti(O\ iso\text{-}C_4H_9)Br_3$; dialkoxytitanium dihalides including $Ti(OCH_3)_2Cl_2$, $Ti(OC_2H_5)_2Cl_2$, $Ti(O\ n\text{-}C_4H_9)_2Cl_2$ and/or $Ti(OC_2H_5)_2Br_2$; trialkoxytitanium monohalides including $Ti(OCH_3)_3Cl$, $Ti(OC_2H_5)_3Cl$, $Ti(O\ n\text{-}C_4H_9)_3Cl$ and/or $Ti(OC_2H_5)_3Br$; and/or tetraalkoxy titaniums including $Ti(OCH_3)_4$, $Ti(OC_2H_5)_4$ and/or $Ti(O\ n\text{-}C_4H_9)_4$. The halogen-containing titanium compound may be a titanium tetrahalide, or titanium tetrachloride. The titanium compounds may be used singly or in combination with each other. The titanium compound may be diluted with a hydrocarbon compound or a halogenated hydrocarbon compound. In an embodiment, a suitable solid catalyst component comprising a non-aromatic internal electron donor is a catalyst solid sold by Lyondell-Basell Inc. under the trade name of Avant™ ZN-168. Such a catalyst is used to exemplify the invention; other titanium supported catalyst systems are contemplated. Other catalyst use mechanisms are contemplated. Including, but not limited to, batch prepolymerization, in situ prepolymerization and other such mechanisms.

Co-Catalysts

Supported Ziegler-Natta catalysts may be used in combination with a co-catalyst, also referred to herein as a Ziegler-Natta co-catalyst. Compounds containing at least one aluminum-carbon bond in the molecule may be utilized as the co-catalysts, also referred to herein as an organoaluminum co-catalyst. Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl aluminum ethoxide and dibutyl aluminum ethoxide; alkyl aluminum sesquialkoxides such as ethyl aluminum sesquiethoxide and butyl aluminum sesqui-butoxide; partially alkoxylated alkyl aluminums having an average composition represented by the general formula $R^1{}_{2.5}Al(OR^2)_{0.5}$; partially halogenated alkyl aluminums, for example, alkyl aluminum dihalides such as ethyl aluminum dichloride, propyl aluminum dichloride and butyl aluminum dibromide; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide. Additional compounds that are suitable for use as a co-catalyst are readily available and amply disclosed in the prior art including U.S. Pat. No. 4,990,477, which is incorporated herein by reference. The organoaluminum Ziegler-Natta co-catalyst may be trimethyl aluminum, triethylaluminum (TEAL), or a combination thereof.

Internal Electron Donors

Electron donors suitable for use herein may be used in two ways in the formation of Ziegler-Natta catalysts and catalyst systems. An internal electron donor may be used in the formation reaction of the catalyst as the transition metal halide is reacted with the metal hydride or metal alkyl. Suitable internal electron donors include amines, amides, ethers, esters, esters, ketones, nitriles, phosphines, stilbenes, arsines, phosphor-amides, thioethers, thioesters, aldehydes, alcoholates, and salts of organic acids. In an embodiment, the internal donor is non-aromatic. The non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof.

The non-aromatic internal electron donor may comprise a $C_1$ to $C_{20}$ diester of a substituted or unsubstituted $C_2$ to $C_{10}$ dicarboxylic acid. In any embodiment, the non-aromatic internal electron donor may be a succinate according to formula (I):

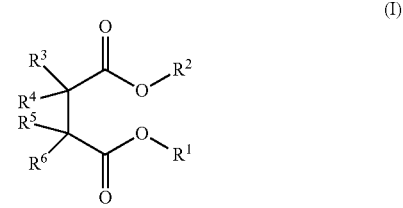

wherein $R^1$, and $R^2$ are independently $C_1$ to $C_{20}$ linear or branched alkyl, alkenyl, or cycloalkyl hydrocarbyl radicals; $R^3$ to $R^6$ are independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, wherein at least two of the $R^3$ to $R^6$ radicals are joined to form a cyclic divalent radical, or a combination thereof. $R^3$ to $R^5$ of formula I may be hydrogen and R6 may be a radical selected from the group consistent of a primary branched, secondary or tertiary alkyl or cycloalkyl radical having from 3 to 20 carbon atoms.

External Electron Donors

In conjunction with an internal donor, two or more external electron donors also may be used in combination with a catalyst. External electron donors include, but are not limited to, organic silicon compounds, e.g., tetraethoxysilane (TEOS), methylcyclohexyldi-methoxysilane (MCMS), propyltriethoxysilane (PTES) and dicyclopentydimethoxysilane (DCPMS). Internal and external-type electron donors are described in U.S. Pat. No. 4,535,068, which is incorporated herein by reference. The use of organic silicon compounds as external electron donors is described in U.S. Pat. Nos. 4,218,339; 4,395,360; 4,328,122; and 4,473,660, all of which are incorporated herein by reference. The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereoregulating capability and hydrogen response of a given external electron donor are directly and inversely related. The DCPMS donor has a substantially lower hydrogen response than the PTES donor, but produces a significantly higher level of stereoregularity than PTES.

The two external electron donors A and B, also referred to herein as the first external electron donor and the second external electron donor, may be selected such that the melt flow rate MFR (A) of homopolypropylene obtained by homopolymerizing propylene by using the first external electron donor (A) in combination with the solid titanium catalyst component and the organoaluminum compound catalyst component and the MFR (B) of homopolypropylene obtained by homopolymerizing propylene by using the second external electron donor (B) under the same conditions as in the case of using the external electron donor (A) have the following relation: $1.2 \leq \log [\text{MFR (B)/MFR (A)}] \leq 1.4$. The external electron donors to be used in the preparation of the electron donor catalyst component may be those electron donors which are used in preparing the solid titanium catalyst component. Each of the external electron donors (A) and (B) may comprise organic silicon compounds.

In any embodiment, the external electron donor may comprise an organic silicon compound of formula $R^3{}_n\text{Si}(OR^4)_{4-n}$, wherein $R^3$ and $R^4$ independently represent a hydrocarbyl radical and $0<n<4$. Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxy-silane, bis-m-tolyldimethoxysilane, bis-p-tolyldimethoxysilane, bis-p-tolyldimethoxysilane, bisethylphenyldimethoxy-silane, dicyclohexyldiethoxysilane, cyclohexylmethyl-dimethoxysilane, cyclohexylmethyldiethoxysilane, ethyltrimethoxysilane, ethyltriethoxysilane, vinyltrimethoxysilane, methyltrimethoxysilane, n-propyl-triethoxysilane, decyltrimethoxysilane, decyltriethoxy-silane, phenyltrimethoxysilane, [gamma]-chloropropyltri-methoxysilane, methyltriethoxysilane, ethyltriethoxy-silane, vinyltriethoxysilane, t-butyltriethoxysilane, n-butyltriethoxysilane, isobutyltriethoxysilane, phenyltriethoxysilane, gamma-aminopropyltri-ethoxysilane, chlorotriethoxysilane, vinyltributoxysilane, cyclo-hexyltrimethoxysilane, cyclohexyltriethoxysilane, 2-norbornanetriethoxysilane, 2-norbornanemethyldimethoxy-silane, ethyl silicate, butyl silicate, trimethyl-phenoxysilane, methylallyloxysilane, vinyltris(beta-methoxyethoxysilane), vinyltriacetoxysilane and/or dimethyltetraethoxydisiloxane.

In any embodiment, one of the two or more organic silicon compounds may comprise the formula $R^1{}_2\text{Si}(OR^2)_2$, wherein $R^1$ represents a hydrocarbyl radical in which the carbon adjacent to Si is secondary or tertiary. Suitable examples include substituted and unsubstituted alkyl groups such as isopropyl, sec-butyl, t-butyl and t-amyl groups, cyclo-alkyl groups such as cyclopentyl and cyclohexyl groups, cycloalkenyl groups such as a cyclopentenyl group, and aryl groups such as phenyl and tolyl groups. In an embodiment, $R^2$ represents a hydrocarbyl radical, or a hydrocarbyl radical having 1 to 5 carbon atoms, or a hydrocarbyl radical having 1 or 2 carbon atoms. Suitable organic silicon compound include diisopropyldimethoxysilane, diisopropyldiethoxysilane, di-sec-butyl-dimethoxysilane, di-t-butyldimethoxysilane, di-t-amyldimethoxysilane, dicyclopentyldimeth-oxysilane, dicyclo-hexyldimethoxysilane, diphenyldimethoxysilane, bis-o-tolyldimethoxy-silane, bis-m-tolyldimethoxysilane, bis-p-tolyldimethoxysilane, and/or bis-ethylphenyldimethoxysilane.

In any embodiment, the organic silicon compound may be represented by the following general formula $R^1{}_n\text{Si}(OR^2)_{4-n}$, wherein n is 2, $R^1$ each represents a hydrocarbyl radical, and at least one of the two hydrocarbyl radicals is a hydrocarbon group in which the carbon adjacent to Si is a primary carbon. Examples of suitable hydrocarbon groups include alkyl groups such as ethyl, n-propyl and n-butyl groups, aralkyl groups such as cumyl and benzyl groups, and alkenyl groups such as a vinyl group, and the like. In any embodiment, $R^2$ may represent a hydrocarbyl radical or having 1 to 5 carbon atoms, or from 1 to 2 carbon atoms. Suitable examples of the organic silicon compounds in which n is 2 include diethyldimethoxysilane, dipropyldimethoxysilane, di-n-butyldimethoxysilane, dibenzyl-dimethoxysilane, and/or divinyldimethoxysilane. Examples of suitable compounds when $0 \leq n < 2$ or $2 < n < 4$ include $R^1$ being an alkyl, cycloalkyl, alkenyl, aryl or aralkyl group and $R^2$ represents a hydrocarbyl radical having 1 to 5 carbon atoms, or 1 to 2 carbon atoms. Suitable examples of the organic silicon compounds in which $0 \leq n < 2$ or $2 < n < 4$ include trimethylmethoxysilane, trimethylethoxysilane, methyl-phenyldimethoxysilane, methyltrimethoxysilane, t-butyl-methyldimethoxysilane, t-butylmethyldiethoxysilane, t-amylmethyldimethoxysilane, phenylmethyldimethoxysilane, cyclohexylmethyldimethoxy-silane, cyclohexylmethyldiethoxysilane, ethyltrimethoxysilane, ethyltriethoxy-silane, vinyltriethoxysilane, methyltrimethoxysilane, methyltriethoxysilane, propyltrimethoxysilane, decyl-trimethoxysilane, decyltriethoxysilane, phenyltri-methoxysilane, propyltriethoxysilane, butyltriethoxysilane, phenyltriethoxysilane, vinyltrimethoxysilane, vinyltributoxysilane, cyclohexyltrimethoxysilane, 2-norbornanetrimethoxysilane, and/or 2-norbornanetriethoxysilane.

In any embodiment the external electron donors may include methyltrimethoxysilane, ethyltrimethoxysilane, ethyltriethoxysilane, vinyltriethoxysilane, propyltrimethoxysilane, decyl-trimethoxysilane, decyltriethoxysilane, propyltri-ethoxysilane, butyltriethoxysilane, phenyltriethoxysilane, vinyltrimethoxysilane, vinyltributoxysilane, and/or cyclohexyltrimethoxysilane.

In any embodiment, the above disclosed organic silicon compounds may be used such that a compound capable of being changed into such an organic silicon compound is added at the time of polymerizing or preliminarily polymerizing an olefin, and the organic silicon compound is formed in situ during the polymerization or the preliminary polymerization of the olefin.

In any embodiment, a first external electron donor may have the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor may have the formula $R^3{}_nSi(OR^4)_{4-n}$, wherein each $R^3$ and $R^4$ are independently a hydrocarbyl radical comprising from 1 to 10 carbon atoms, n is 1, 2, or 3; and the second external electron donor is different than the first external electron donor. In any embodiment, the first external electron donor and the second external electron donor may be selected from the group consisting of tetraethoxysilane, methyl-cyclohexyldimethoxysilane, propyltriethoxysilane, dicyclopentyldimethoxysilane, and combinations thereof. The Ziegler-Natta catalyst system may comprise 2.5 mol % to less than 50 mol % of the first external electron donor and greater than 50 mol % of a second external electron donor based on total mol % of external electron donors. In any embodiment, the first electron donor may comprise, consist of, or consist essentially of dicyclopentyldimethoxysilane (DCPMS) and the second external electron donor may comprise, consist of, or consist essentially of propyltriethoxysilane (PTES). The relationship between the first external electron donor and the second external electron donor may be defined by an equation $1.2 \leq \log[MFR(B)/MFR(A)] \leq 1.4$, wherein MFR(A) as described herein.

Polymerization Process

A method to make a polypropylene resin may comprise contacting propylene monomers at propylene polymerization conditions with a catalyst system to produce a polypropylene resin having an MWD greater than 5 and a melt strength of at least 20 cN determined using an extensional rheometer at 190° C., the catalyst system comprising: a Ziegler-Natta catalyst comprising a non-aromatic internal electron donor; and first and second external electron donors comprising different organosilicon compounds. The first external electron donor may have the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor may have the formula $R^3{}_nSi(OR^4)_{4-n}$, wherein each $R^3$ and $R^4$ are independently a hydrocarbyl radical comprising from 1 to 10 carbon atoms, n is 1, 2, or 3, and the second external electron donor is different than the first external electron donor. The non-aromatic internal electron donor may comprise an aliphatic amine, amide, ester, ether, ketone, nitrile, phosphine, phosphoramide, thioether, thioester, aldehyde, alcoholate, carboxylic acid, or a combination thereof, or a $C_1$ to $C_{20}$ diester of a substituted or unsubstituted $C_2$ to $C_{10}$ dicarboxylic acid, or a succinate as described herein.

The polymerization process according to the instant disclosure includes contacting propylene with any embodiment herein described of the catalyst system under polymerization conditions. The polymerization process may include a preliminary polymerization step. The preliminary polymerization may include utilizing the Ziegler-Natta catalyst system comprising the non-aromatic internal electron donor in combination with at least a portion of the organoaluminum co-catalyst wherein at least a portion of the external electron donors are present wherein the catalyst system is utilized in a higher concentration than utilized in the subsequent "main" polymerization process. The concentration of the catalyst system in the preliminary polymerization, based on the moles of titanium present, may be 0.01 to 200 millimoles, or 0.05 to 100 millimoles, calculated as titanium atom, per liter of an inert hydrocarbon medium. The organoaluminum co-catalyst may be present in an amount sufficient to produce 0.1 to 500 g, or 0.3 to 300 g, of a polymer per gram of the titanium catalyst present, and may be present at 0.1 to 100 moles, or 0.5 to 50 moles, per mole of the titanium atom present in the catalyst component. During the preliminary polymerization, a molecular weight controlling agent such as hydrogen may be used. The molecular weight controlling agent may desirably be used in such an amount that the polymer obtained by preliminary polymerization has properties consistent with the intended product. In any embodiment, the preliminary polymerization may be carried out so that 0.1 to 1000 g, or 0.3 to 300 g, of a polymer forms per gram of the titanium catalyst.

The polymerization of the olefin may be carried out in the gaseous phase, the liquid phase, bulk phase, slurry phase, or any combination thereof. In slurry polymerization schemes, the inert hydrocarbon may be used as a reaction solvent, or an olefin liquid under the reaction conditions may be used as the solvent.

In any embodiment, the titanium catalyst may be present in the reactor at 0.005 to 0.5 millimole, or 0.01 to 0.5 millimole, based on Ti mols per liter of the reaction zone. The organoaluminum co-catalyst may be present in an amount sufficient to produce 1 to 2,000 moles, or 5 to 500 moles of aluminum per mole of the titanium atom in the catalyst system. The internal electron donor may be present at 0.2 to 5.0 or 0.5 to 2.0 per mole of Ti. The total amount of the external electron donors may be 0.001 to 50 moles, or 0.01 to 20 moles, or 0.05 to 10 mole Si per mole of Ti present. The first external electron donor may be present in the catalyst system at from 2.5 to 50 mol %, or 2.5 to 10 mol % of the total amount of external electron donor present.

In any embodiment, polymerization conditions may include a polymerization temperature of 20 to 200° C., or 50 to 180° C., and a pressure from atmospheric pressure to 100 kg/cm², or from 2 to 50 kg/cm². The polymerization process may be carried out batchwise, semicontinuously or continuously. The polymerization may be carried out in two or more stages, using two or more reactors under different reaction conditions, utilizing different internal electron donors, different external electron donors, and/or different catalyst systems.

In any embodiment, the polypropylene resin may be produced in a bulk continuous reactor. A catalyst system comprising a magnesium chloride supported titanium catalyst according to one or more embodiments of the instant disclosure is utilized. Catalyst preparation may be carried out continuously in situ by contacting the catalyst solids, triethylaluminum, and the external electron donor system under conditions known in the art to yield active, stereo-specific catalyst for polymerization of propylene. The activated catalyst may then be continuously fed into a prepolymerization reactor where it was continuously polymerized in propylene to a productivity of approximately 100 to 400 g-polymer/g-cat. The prepolymerized catalyst may then be continuously fed into a bulk slurry reactor, and polymerization continued at 70° C. to 80° C., for a residence time of 90 minutes. The reaction slurry (homopolymer granules in bulk propylene) may then be removed from the reactor and the polymer granules continuously separated from the liquid propylene. The polymer granules may then be separated from the unreacted monomer to produce a granular product for compounding and/or mechanical properties. In an embodiment, hydrogen is used in the reactor to control the melt flow rate of the polypropylene resin.

In the case of impact copolymer resin production, the granules from the bulk reactor, after removing the monomer, are fed directly into a gas phase reactor (GPR) where polymerization is continued under conditions known in the art to produce ethylene-propylene bipolymer within the pores of the polymer granules. The final product, referred to in the art as an "impact copolymer," is continuously withdrawn from the gas phase reactor and separated from unreacted monomer to produce a granular product for compounding and further processing. The molecular weight of the ethylene-propylene rubber or more appropriately, Intrinsic Viscosity (IV) of the rubber phase is controlled by the concentration of hydrogen in the GPR.

In any embodiment, the granules from the reactor may be stabilized with at least 0.01 wt % of an additive, e.g., 0.15 wt % Irganox™ 1010, 0.05 wt % Ultranox™ 626A, and/or with 0.075 wt % sodium benzoate (fine form) and then pelletized, e.g., on a 30 mm Werner & Pfleiderer twin screw extruder. The pellets may then be injection molded, extruded into a film, and/or subjected to further processing.

Polypropylene Resins

In any embodiment, a polypropylene resin having an MWD (Mw/Mn) greater than 5, a branching index (g') of at least 0.95, and a melt strength greater than 20 cN determined using an extensional rheometer at 190° C. For purposes herein, the melt strength of a polymer at a particular temperature, e.g., 190° C., is determined with a Gottfert Rheotens Melt Strength Apparatus (e.g., Gottfert Rheotens 71.97). The measurement is accomplished by grasping the extrudate from a capillary rheometer (e.g., a Gottfert Rheograph 2002 capillary rheometer), or from an extruder equipped with a capillary die, after the extrudate has been extruded 100 mm using variable speed gears and increasing the gear speed at a constant acceleration (12 mm/s$^2$, starting from an initial, zero-force calibration velocity of 10 mm/s) until the molten polymer strand breaks. The force in the strand is measured with a balance beam in conjunction with a linear variable displacement transducer. The force required to extend and then break the extrudate is defined as the melt strength. The force is measured in centinewtons (cN). A typical plot of force vs. wheel velocity is known in the art to include a resonate immediately before the strand breaks. In such cases, the plateau force is approximated by the midline between the oscillations.

One of the most distinctive improvements of the polypropylene resins disclosed herein is an unexpectedly high melt strength. Melt strength is a key property of products used in blown film, thermoforming, blow molding processes, and the like. In a blown film process, high melt strength is required to maintain a stable bubble when running at high temperatures, and/or at high production rates, especially on large lines. If the melt strength is unacceptably low, holes form in a molten web, which causes the bubble to collapse and occasionally tear off. This, in turn, results in loss of production, and can lead to subsequent quality problems if the material in the extruder begins to degrade during the down-time. Low melt strength in linear polyethylenes precludes the film manufacturer from taking advantage of the excellent draw-down characteristics inherent with most linear polyethylenes unless a melt strength enhancer, such as LDPE, is added. In any embodiment, a polypropylene resin according to any of the embodiments disclosed herein may have a melt strength of at least 20 cN, or at least 25 cN, or at least 30 cN, or at least 35 cN, or at least 40 cN, or at least 45 cN, or at least 50 cN, or at least 55 cN, or at least 60 cN, or at least 65 cN, or at least 70 cN, or at least 75 cN, or at least 80 cN, or from 50 cN to 200 cN, or from 60 cN to 150 cN, or from 70 cN to 200 cN, or any combination thereof, determined using an extensional rheometer at 190° C. as described herein.

A polypropylene resin according to any of the embodiments disclosed herein may comprise at least 50 mol % propylene and has an MWD (Mw/Mn) of greater than 5, or greater than or equal to 6, or from 6 to 20, or from 6 to 15, or any combination thereof.

The polypropylene resin according to any of the embodiments disclosed herein further may comprise at least 75 mol %, or at least 80 mol %, or at least 90 mol %, or at least 95 mol %, or at least 99 mol % propylene. In any embodiment a polypropylene resin may be a propylene homopolymer. In other embodiments, a polypropylene resin may comprise from 0.1 to 10 mol % of a comonomer. The comonomer may be an alpha olefin, preferably selected from the group consisting of ethylene and $C_4$ to $C_{20}$ olefins.

In any embodiment, the polypropylene resin may have a branching index (g') of at least 0.95, or at least 0.99. The polypropylene resin according to any of the embodiments disclosed herein may have a viscosity ratio of greater than or equal to 35, or 40, or 45, or from 35 to 80 determined at an angular frequency ratio of 0.01 and at an angular frequency ratio of 100 rad/s (at an angular frequency ratio of 0.01 to 100 rad/s) at a fixed strain of 10% at 190° C. In any embodiment, the polypropylene resin may have a MFR range from 0.1 to 100, or from 0.3 to 10, when determined according to ASTM D1238 Condition L. The polypropylene resin may have a heat distortion temperature of greater than or equal to 100° C., determined according to ASTM D648 using a load of 0.45 MPa (66 psi). In any embodiment, the polypropylene resin may have an isopentad percentage of greater than 90%, or greater than 95%, or greater than 99%.

In any embodiment, the polypropylene resin may have a stiffness (flexural modulus) of greater than 2000 MPa, or greater than 2100 MPa, or 290 kpsi (2000 MPa) to 360 kpsi (2500 MPa) determined according to ASTM D790A on samples nucleated with 0.1% sodium benzoate. In any embodiment, the polypropylene may have a flexural modulus which is 5%, or 10%, or 15%, or 20%, or 25% greater than a flexural modulus of a comparative polypropylene homopolymer when measured according to ASTM D790A.

In any embodiment, the polypropylene resin may be an impact copolymer. For purposes herein, an impact copolymer refers to a resin comprising a homopolymer made in a bulk polymerization reactor followed by transferring the granules to the gas phase reactor and making ethylene-propylene rubber within the granules.

In any embodiment, the polypropylene resin may be a non-functionalized polymer or resin. For purposes herein a non-functionalized resin does not comprise grafted or otherwise post-reactor processed olefin polymers. By functionalized (or grafted) it is meant that various functional groups are incorporated, grafted, bonded to, and/or physically or chemically attached to the polymer backbone of the polymer being functionalized after formation of the base polymer. For purposes herein, functionalized polymers further include polymers grafted onto other polymers. A functionalized polymer is considered to have indications of long chain branching (i.e., a g' less than 0.95), consistent with the cross-linking and intermolecular bonding associated with functionalized polymers. For purposes herein, a functionalized polymer comprises greater than 0.1 wt % of a functional group and/or a g'<0.95, and/or is the product of a post reactor functionalization or grafting process. Accordingly, a non-functionalized polymer comprises less than 0.1 wt % of a functional group and/or is not the product of a post-reactor functionalization process, and/or is not a post-reactor grafted polymer and/or has a g'>0.95 determined as described herein. The resin may be free of functionalized polypropylene or comprises less than 5 weight percent of functional groups selected from hydroxide, aryls, substituted aryls, halogens, alkoxys, carboxylates, esters, acrylates, and carboxyl, based upon the weight of the polypropylene resin, and wherein the number of carbons of the polypropylene resin involved in olefinic bonds is less than 5% of the total number of carbon atoms in the resin. In an embodiment the resin is free of post-reactor grafted polypropylene or comprises less than 5 percent by weight of post-reactor grafted polypropylene.

In any embodiment the resin may be produced by contacting propylene monomers at propylene polymerization conditions with a catalyst system comprising a Ziegler-Natta catalyst comprising a non-aromatic internal electron donor and first and second external electron donors comprising different organosilicon compounds.

In any embodiment, a polypropylene resin may have an MWD (Mw/Mn) greater than 5, a branching index (g') of at least 0.95, and a melt strength greater than 20 cN determined using an extensional rheometer at 190° C., wherein the resin is produced by contacting propylene monomers at a temperature and a pressure according to any method or process disclosed herein utilizing any embodiment or combination of embodiments of the catalyst system as disclosed herein. In any embodiment, the resin may be produced by contacting propylene monomers at a temperature and a pressure in the presence of catalyst system comprising a Ziegler-Natta catalyst comprising a non-aromatic internal electron donor and two or more external electron donors. The first external electron donor may have the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3{}_nSi(OR^4)_{4-n}$, wherein each $R^3$ and $R^4$ are independently a hydrocarbyl radical comprising from 1 to 10 carbon atoms, wherein n is 1, 2, or 3; and wherein the second external electron donor is different than the first external electron donor.

The polypropylene resin according to any of the embodiments disclosed herein and films produced therefrom may comprise a blend of various additive components. The blends may be formed using conventional equipment and methods, such as by dry blending the individual components and subsequently melt mixing in a mixer, or by mixing the components together directly in a mixer or a single or twin-screw extruder, which may include a compounding extruder and a side-arm extruder used directly downstream of a polymerization process, which may include blending powders or pellets of the resins at the hopper of the film extruder.

Additionally, additives may be included in the blend, in one or more components of the blend, and/or in a product formed from the blend, such as a molded article, a foam, a film, or the like. Such additives are well known in the art and in an embodiment may include: reinforcing fillers, non-reinforcing fillers; scratch resistant agents; plasticizers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; extender oils, lubricants; talc; anti-fogging agents; foaming agents; flame/fire retardants; blowing agents, vulcanizing or curative agents, vulcanizing or curative accelerators, cure retarders, processing aids, tackifying resins, and other processing aids known in the polymer compounding art; or a combination thereof.

In any embodiment, the polypropylene resin may further comprise greater than or equal to 0.01 wt % of one or more additives selected from the group consisting of reinforcing fillers; non-reinforcing fillers; scratch resistant agents; plasticizers; antioxidants; phosphites; anti-cling additives; tackifiers; UV stabilizers; heat stabilizers; anti-blocking agents; release agents; anti-static agents; pigments; colorants; dyes; waxes; silica; extender oils; lubricants; talc; anti-fogging agents; foaming agents; flame/fire retardants; blowing agents; vulcanizing agents; curative agents; vulcanizing accelerators; curative accelerators; cure retarders; processing aids; tackifying resins; and a combination thereof. The list described herein is not intended to be inclusive of all types of additives which may be employed with the present invention. Upon reading this disclosure, those of skilled in the art will appreciate other additives may be employed to enhance properties.

As is understood by the skilled in the art, the blends of the present invention may be modified to adjust the characteristics of the blends as desired. The aforementioned additives may be either added independently or incorporated into an additive or master batch. Such additives may comprise up to 70 wt %, or up to 65 wt %, of the total composition.

In any embodiment, fillers and extenders which can be utilized include conventional or nanosized inorganics such as calcium carbonate, clays, silica, talc, titanium dioxide, carbon black, mica, silicate, combinations thereof, and the like. Extender oils, processing oils, and/or plasticizers may also be used.

The propylene resin according to the instant disclosure and films produced therefrom may also comprise slip agents or mold-release agents to facilitate processability present at 50 ppm to 10 wt %, or 50 to 5000 ppm, or 0.01 to 0.5 wt % (100 to 5000 ppm), or 0.1 to 0.3 wt % (1000 to 3000 ppm), based upon the weight of the composition. Desirable slip additives include, but are not limited to saturated fatty acid amides; saturated ethylene-bis-amides; unsaturated fatty acid amides; unsaturated ethylene-bis-amides; glycols; polyether polyols; acids of aliphatic hydrocarbons; esters of aromatic or aliphatic hydrocarbons; styrene-alpha-methyl styrene; fluoro-containing polymers; silicon compounds; sodium alkylsulfates, alkyl phosphoric acid esters; stearates such as zinc stearate and mixtures thereof. Preferred slip additives are unsaturated fatty acid amides, which are available from Crompton (Kekamide™ grades) and Croda Universal (Crodamide™ grades).

Scratch resistant agents suitable for use herein include talc, fatty acid (oleamide and erucamide), inosilicate such as wollastonite, pectolite or okenite, high MW silicones, ionomers, and others. Some of the slip agents and fillers described above can also serve as scratch resistant agents. Examples of suitable scratch resistance improving polymers for use herein include high molecular weight silicone rubbers, such as polysiloxanes, having molecular weights of from a few hundred to several hundred thousand g/mol, with corresponding viscosities of 1 to 10 million mm$^2$/s. Polysiloxanes, suitable for use herein include polydimethylsiloxanes. The Mw's of preferred polysiloxanes are at least 50,000 g/mol, or at least 100,000 g/mol, or at least 200,000 g/mol. The viscosities of polysiloxanes are at least 10,000 mm$^2$/s, or at least 100,000 mm$^2$/s, or at least 1,000,000 mm$^2$/s. The polysiloxanes may be used as neat materials or mixed via extrusion with various thermoplastics. The ultra-high molecular weight, ultra-high viscosity polysiloxanes are typically solid, pellet form blends of a thermoplastic polymer and 25 to 50 weight % of the polysiloxane. Examples of polysiloxane masterbatches are the commercially available products MB50 available from Dow Corning, e.g., MB50-0002 or MB50-321.

Suitable additives may include a nanocomposite, which is a blend of polymer with one or more organo-clays. Illustrative organo-clays can include one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. Further, the organo-clay can be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and/or florine mica.

When present, the organo-clay is included in the nanocomposite at from 0.1 to 50 wt %, based on the total weight of the nanocomposite. The stabilizing functionality may be selected from one or more of phenols, ketones, hindered amines, substituted phenols, substituted ketones, substituted hindered amines, and combinations thereof. The nanocomposite can further comprise at least one elastomeric ethylene-propylene copolymer present in the nanocomposite at from 1 to 70 wt %, based on the total composition.

The additives such as fillers and oils can be introduced into the polymer during the polymerization, into the effluent from the polymerization zone or added into the polymer after removal of solvent or diluent through melt blending.

Additional polymers can also be added to polypropylene polymers disclosed herein. Suitable additional polymers include thermoplastic resins or thermoplastic elastomers. Exemplary thermoplastic resins include crystalline polyolefins. Also, suitable thermoplastic resins may include copolymers of polyolefins with styrene, such as a styrene-ethylene copolymer. In one or more embodiments, the thermoplastic resins additives are formed by polymerizing ethylene or alpha-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another alpha-olefin such as 1-butene, 1-hexene, 1-octene, 2-methyl-1-propene, 3-methyl-1-pentene, 4-methyl-1-pentene, 5-methyl-1-hexene, or mixtures thereof are also contemplated. Specifically included are the homo-polypropylene, impact, and random copolymers of propylene with ethylene or the higher alpha-olefins, described above. In an embodiment, the homo-polypropylene has a melting point of at least 130° C., for example at least 140° C. and or less than or equal to 170° C., a heat of fusion of at least 75 J/g, alternatively at least 80 J/g, as determined by DSC analysis, and weight average molecular weight (Mw) of at least 50,000, alternatively at least 100,000. Comonomer contents for these propylene copolymers will typically be from 1% to 30% by weight of the polymer (See, for example, U.S. Pat. Nos. 6,268,438; 6,288,171; and 6,245,856). Copolymers available under the trade name VISTAMAXX™ (ExxonMobil, Houston Tex.) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Inventive Films

In any embodiment, a film may comprise a polypropylene resin according to any embodiment or combination of embodiments disclosed herein. The film may be an extruded blown film, a cast film, or a combination thereof. The film comprises a propylene resin having an MWD (Mw/Mn) greater than 5, a branching index (g') of at least 0.95, and a melt strength greater than 20 cN determined using an extensional rheometer at 190° C.

The polypropylene resins disclosed herein may be utilized to prepare monolayer films or multilayer films. These films may be formed by any number of well-known extrusion or coextrusion techniques as readily understood by one having minimal skill in the art. Films may be unoriented, uniaxially oriented, or biaxially oriented. Physical properties of the film may vary depending on the film forming techniques used.

Multiple-layer films may be formed by methods well known in the art. The total thickness of multilayer films may vary based upon the application desired. In an embodiment, a total film thickness may be 5-100 μm, or 10-50 μm, depending the intended end use application. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together, but differing in composition. Coextrusion can be adapted for use in both cast film or blown film processes.

When used in multilayer films, the propylene resin disclosed herein may be used in any layer of the film, or in more than one layer of the film, as desired. When more than one layer of the film comprises the inventive propylene resin, each such layer can be individually formulated; i.e., the layers formed of the propylene resin can be the same or different chemical composition, density, melt index, thickness, and the like, depending upon the desired properties of the film.

To facilitate discussion of different film structures, the following notation is used herein. Each layer of a film is denoted "A" or "B", where "A" indicates a conventional film layer as defined below, and "B" indicates a film layer comprising the polypropylene resin according to any embodiment disclosed herein. Where a film includes more than one A layer or more than one B layer, one or more prime symbols (', ", "', etc.) are appended to the A or B symbol to indicate layers of the same type (conventional or inventive) that can be the same or can differ in one or more properties, such as chemical composition, density, melt index, thickness, and the like. Finally, the symbols for adjacent layers are separated by a slash (/). Using this notation, a three-layer film having an inner layer of an embodiment of the polypropylene disclosed herein disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A". The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 µm each and a B layer of 30 µm is denoted as 20/60/20.

For the various films described herein, the "A" layer can be formed of any material known in the art for use in multilayer films or in film-coated products. Thus, for example, each A layer can be formed of a polyethylene homopolymer or copolymer, and the polyethylene can be, for example, a VLDPE, a LDPE, a LLDPE, a MDPE, a HDPE, or a DPE, as well as other polyethylenes known in the art. The polyethylene can be produced by any suitable process, including metallocene-catalyzed processes and Ziegler-Natta catalyzed processes. Further, each A layer can be a blend of two or more such polyethylenes, and can include additives known in the art. Further, one skilled in the art will understand that the layers of a multilayer film must have the appropriate viscosity match. In multilayer structures, one or more A layers can also be an adhesion-promoting tie layer, such as PRIMACOR™ ethylene-acrylic acid copolymers available from The Dow Chemical Company, and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and/or paper.

The "B" layer comprises the polypropylene resin according to an embodiment disclosed herein, and/or any of such blends described herein. In any embodiment, the B layer may comprise, consist essentially of, or consist of the inventive polypropylene resin having an MWD (Mw/Mn) greater than 5, a branching index (g') of at least 0.95, and a melt strength greater than 20 cN determined using an extensional rheometer at 190° C. The propylene resin may comprise one or more of the following properties: a MWD is from 6 to 15; a melt strength from 50 cN to 200 cN; a viscosity ratio of from 35 to 80 determined from the complex viscosity ratio at 0.01 to 100 rad/s angular frequency at a fixed strain of 10% at 190° C.; a heat distortion temperature of greater than or equal to 100° C., determined according to ASTM D648 using a load of 0.45 MPa (66 psi); an isopentad percentage of greater than 95%; an MFR from 0.1 to 100, determined according to ASTM D1238 Condition L; and/or a stiffness of from 2000 MPa (290 kpsi) to 2500 MPa (360 kpsi) determined according to ASTM D790A on samples nucleated with 0.1% sodium benzoate.

The thickness of each layer of the film, and of the overall film, is not particularly limited, but is determined according to the desired properties of the film. In an embodiment, film layers have a thickness of from 1 to 1000 µm, or from 5 to 100 µm, and may have an overall thickness of from 10 to 100 µm. Microlayer technology may be used to produce films with a large number of thinner layers, for example, 24, 50, or 100 layers, in which the thickness of an individual layer is less than 1 µm. Individual layer thicknesses for these films may be less than 0.5 µm, or less than 0.25 µm, or less than 0.1 µm.

In any embodiment, an embodiment of the propylene resin or a blend thereof may be utilized to prepare monolayer films, i.e., a film having a single layer which is a B layer as described above. In any embodiment, using the nomenclature described above, multilayer films have any of the following exemplary structures: (a) two-layer films, such as A/B and B/B; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B'''/B'''; (d) five-layer films, such as A/A'/A"/A'''/B, A/A'/A"/B/A''', A/A'/B/A"/A''', A/A'/A''/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/N, B/A/A'/B'/B", B/A/B'/A'/B", B/A/B'/B"/A', A/B/B'/B"/B''', B/A/B'/B"/B''', B/B'/A/B"/B''', and B/B'/B"/B'''/B''''; and similar structures for films having six, seven, eight, nine, twenty-four, forty-eight, sixty-four, one hundred, or any other number of layers. It should be appreciated that films having still more layers can be formed using the inventive propylene or blends, and such films are within the scope of the instant disclosure.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films comprising propylene polymers may also be used as coatings; e.g., films comprising the inventive polymers or polymer blends, or multilayer films including one or more layers formed of the inventive polymers or polymer blends, can be coated onto a substrate such as paper, metal, glass, plastic and other materials capable of accepting a coating. Such coated structures are also within the scope of the instant disclosure.

The films can be cast films or blown films. The films can further be embossed, or produced or processed according to other known film processes. The films can be tailored to specific applications by adjusting the thickness, materials and order of the various layers, as well as the additives in or modifiers applied to each layer.

Films comprising the propylene polymers and polymer blend compositions, monolayer or multilayer, may be formed by using casting techniques, such as a chill roll casting process. For example, a composition can be extruded in a molten state through a flat die and then cooled to form a film. As a specific example, cast films can be prepared using a cast film line machine as follows. Pellets of the polymer are melted at a temperature typically ranging from 200° C. to 300° C. for cast propylene resins (depending upon the particular resin used), with the specific melt temperature being chosen to match the melt viscosity of the particular resin layers. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically 0.025 inches (600 μm). The material is then drawn down to the final gauge. The material draw down ratio is typically 21:1 for 0.8 mil (20 μm) films. A vacuum box, edge pinners, air knife, or a combination of the foregoing can be used to pin the melt exiting the die opening to a primary chill roll maintained at 32° C. The resulting polymer film is collected on a winder. The film thickness can be monitored by a gauge monitor, and the film can be edge trimmed by a trimmer. A typical cast line rate is from 250 to 2000 feet per minute. One skilled in the art will appreciate that higher rates may be used for similar processes such as extrusion coating. One or more optional treaters can be used to surface treat the film, if desired. Such chill roll casting processes and apparatus are well known in the art, and are described, for example, in The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed.

Films comprising the polypropylene polymers and polymer blend compositions, monolayer or multilayer, may also be formed using blown techniques, i.e., to form a blown film. For example, the composition can be extruded in a molten state through an annular die and then blown and cooled/quenched to form a tubular, blown film, which can then be axially slit and unfolded to form a flat film. As a specific example, blown films can be prepared wherein the polypropylene polymer composition is introduced into the feed hopper of an extruder. The film can be produced by extruding one or more of the polymer compositions through a die into a film cooled by blowing air onto the surface of the film. The film is drawn from the die typically forming a cylindrical film that is cooled/quenched, collapsed and, optionally, subjected to a desired auxiliary process, such as slitting, treating, sealing, surface treatment, and/or printing. In an embodiment, melt temperatures are from 175° C. to 225° C. Blown film rates are generally from 5 to 30 lbs per hour per inch of die circumference. The finished film can be wound into rolls for later processing, or can be fed into a bag machine and converted into bags. A particular blown film process and apparatus suitable for forming films according to embodiments described herein are described in U.S. Pat. No. 5,569,693. Of course, other blown film forming methods can also be used.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction, as is readily understood by one having minimal skill in the art.

The film according to the instant disclosure may be suitable for uses including stretch films, shrink films, bags (i.e., shipping sacks, trash bags and liners, industrial liners, and produce bags), flexible and food packaging (e.g., fresh cut produce packaging, frozen food packaging), personal care films, pouches, medical film products (such as IV bags), diaper backsheets and housewrap. The films may also be suitable for uses which include packaging, for example by bundling, packaging and unitizing a variety of products. Applications for such packaging include various foodstuffs, rolls of carpet, liquid containers and various like goods normally containerized or palletized for shipping, storage, or display.

Stretch cling films may be formed from the propylene polymers and polymer blends described herein. The stretch cling films may be monolayer or multilayer, with one or more layers comprising an embodiment of the propylene polymer. The films may be coextruded, comprising one or more layers comprising one or more embodiments of the propylene polymer described herein, along with one or more layers of traditional Ziegler-Nana or metallocene-catalyzed polyolefin polymers including, but not limited to polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, which may include a comonomer such as, for example, hexene or octene, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

Films disclosed herein may be suited for use in stretch handwrap films. Stretch film handwrap requires a combination of excellent film toughness, especially puncture and dart drop performance, and a very stiff, i.e., difficult to stretch film. This film 'stiffness' is required to minimize the stretch required to provide adequate load holding force to a wrapped load and to prevent further stretching of the film. The film toughness is required because handwrap loads (being wrapped) are typically more irregular and frequently contain greater puncture requirements than typical machine stretch loads. In some embodiments, the films may be downgauged stretch handwrap films. In further embodiments, films comprising the inventive propylene resin may be blended with LDPE, other LLDPEs, or other polymers to obtain a material with characteristics suitable for use in stretch handwrap films.

Further product applications also include surface protection applications, with or without stretching, such as in the temporary protection of surfaces during manufacturing, transportation, and the like. There are many potential applications of articles and films produced from the polymer blend compositions described herein.

The polypropylene resins as described herein have molecular characteristics which allow them to be processed into films at relatively high speeds, such as those obtained by high stalk extrusion processes. Mechanical strength of the film is different in two film directions, along the film roll (machine direction, MD) and in the perpendicular direction (transverse direction, TD). Typically, the TD strength in such films is significantly higher than their MD strength. The films manufactured from the propylene resins prepared in the process of this invention with the catalysts described herein have a favorable balance of the MD and TD strengths.

The propylene resins according to the instant disclosure may be used to produce films which are essentially gel free. For purposes herein, gel defects are determined visually utilizing a blown film having a thickness of 38.1 microns (1.5 mils). The area analyzed is 5 cm×5 cm. The defects in the film are first identified visually using optical microscopy at 8× magnification, then quantified in terms of the number of gel defects per unit area having a particular size or which fit within a particular range of sizes. The sizes reported are typically gel defects having a size (e.g., having a major axis or having a diameter of) greater than 500 microns and less than 10 microns. In any embodiment, the propylene resin produces films having less than 10 gels, or less than 5 gels, or less than 1 gel having a size of 1 micron or larger, when determined using optical microscopy at 8× magnification in a 5 cm square of a blown film having a thickness of 1.5 mils. In any embodiment, the propylene resin according to the instant disclosure produces films having less than 10 gels, or less than 5 gels, or less than 1 gels having a size of less than 10 microns, of greater than 500 microns, or both, when determined using optical microscopy at 8× magnification in a 5 cm square of a blown film having a thickness of 38.1 microns. In any embodiment, the propylene resin according to the instant disclosure produces films which are essentially free of gels having a size of 10 microns or less, of greater than 500 microns, or both, when determined using optical microscopy at 8× magnification in a 5 cm square of a blown film having a thickness of 38.1 microns. Accordingly, in any embodiment, a film comprising an embodiment of the propylene resin is characterized by containing essentially zero (i.e., less than 1 total) gels having a size of 10 microns or less, and greater than 500 microns, wherein the gel content is determined by optical microscopy at 8× magnification of a 5 cm square of a blown film having a thickness of 38.1 microns (1.5 mils). In an embodiment, the optical microscopy is conducted at 8× magnification with a magnifier e.g., Fischer part # FIS #12-071-6C, or an equivalent thereof, also referred to in the art as a watchmaker loupe magnifier.

Films according to the instant disclosure demonstrate improved performance and mechanical properties when compared to films previously known in the art. For example, films containing the propylene resins have improved stiffness, melt strength, bending stiffness, tensile strength, tensile modulus, Elmendorf tear strength, dart drop impact, and/or the like. The films also have a good balance of stiffness vs. toughness as indicated by machine direction tear strength, 1% secant modulus, and dart drop impact strength performance. In addition, such films may also exhibit higher ultimate stretch and have better processability when compared with other resins and blends.

A film according to the instant disclosure may have a 10% offset yield stress in the machine direction (MD) of greater than 15, or greater than 18, or greater than 20 MPa, determined according to ASTM D882; and/or may have a 10% offset yield stress in the transverse direction (TD) of greater than 15, or greater than 18, or greater than 20 MPa, determined according to ASTM D882; and/or may have an elongation at yield in the machine direction (MD) of greater than 5, or greater than 7, or greater than 8%, determined according to ASTM D882; and/or may have an elongation at yield TD of greater than 5, or greater than 7, or greater than 8%, determined according to ASTM D882; and/or may have a stress at yield MD of greater than 18, or greater than 20, or greater than 21 MPa, determined according to ASTM D882; and/or may have a stress at yield TD of greater than 18, or greater than 19, or greater than 20 MPa, determined according to ASTM D882; and/or may have a tensile strength at break MD of greater than 60, or greater than 70, or greater than 80 MPa, determined according to ASTM D882; and/or may have a tensile strength at break TD of greater than 60, or greater than 70, or greater than 80 MPa, determined according to ASTM D882; and/or may have an elongation at break MD of greater than 650, or greater than 680, or greater than 700%, determined according to ASTM D882; and/or may have an elongation at break TD of greater than 650, or greater than 680, or greater than 700%, determined according to ASTM D882; and/or may have an energy at break MD of greater than 200, or greater than 210, or greater than 250 mJ/mm$^3$, determined according to ASTM D882; and/or may have an energy at break TD of greater than 200, or greater than 210, or greater than 250 mJ/mm$^3$, determined according to ASTM D882; and/or may have a 1% secant modulus MD of greater than 550, or greater than 600, or greater than 700 MPa, determined according to ASTM D882; and/or may have a 1% secant modulus TD of greater than 550, or greater than 600, or greater than 700 MPa, determined according to ASTM D882; and/or may comprise greater than or equal to 20 wt % propylene; or from 20 wt % to 80 wt % propylene; and/or may comprise greater than or equal to 10 wt % polypropylene according to any embodiment disclosed herein; or from 20 wt % to 80 wt % polypropylene according to any embodiment disclosed herein; and/or may have a two point bending stiffness force at 30° of greater than 90, or greater than 100, or greater than 120 mN, determined using a 40 micron film according to DIN 53121; and/or may have a two point bending stiffness force at 30° of greater than 290, or greater than 300, or greater than 350 mN, determined using an 80 micron film according to DIN 53121; and/or may have a normalized two point bending stiffness force at 30° of greater than 2.5, or greater than 3.4, or greater than 3.5 mN/μm, determined using an 80 micron film according to DIN 53121; and/or may have a two point bending stiffness bending modulus at 10°-25° of greater than 350, or greater than 400, or greater than 450 MPa, determined using a 40 micron film according to DIN 53121; and/or may have a two point bending stiffness bending modulus at 10°-25° of greater than 500, or greater than 550, or greater than 600 MPa, determined using an 80 micron film according to DIN 53121; and/or may have a two point bending stiffness of greater than 1.6, or greater than 2, or greater than 2.5 mN-mm, determined using a 40 micron film according to DIN 53121; and/or may have a two point bending stiffness of greater than 20, or greater than 23, or greater than 25 mN-mm, determined using an 80 micron film according to DIN 53121; and/or may have a dart impact AF50% of greater than 235, or greater than 240, or greater than 250 g, determined using a 40 micron film according to ASTM D1709; and/or may have a dart impact AF50% of greater than 500, or greater than 520, or greater than 530 g, determined using an 80 micron film according to ASTM D1709; and/or may have a dart impact AF50% normalized value of greater than 6.1, or greater than 6.2, or greater than 6.3 g/μm, determined according to ASTM D1709; and/or may have an Elmendorf tear strength MD of greater than 2.0 g/μm for a 40 micron film, or greater than 4.5 g/μm for an 80 micron film, determined according to ASTM-D1922; and/or an Elmendorf tear strength TD of greater than 13.5 g/μm for a 40 micron film, or greater than 13.5 g/μm for an 80 micron film, determined according to ASTM-D1922. In an embodiment, the propylene resin according to the instant disclosure is suitable to produce a film therefrom downgauged relative to a film produced in the absence of instant propylene resin. The film may be downgauged at least a 5%, or from 5% to 10% relative to a film prepared via an identical process in the absence of the propylene resin according to the instant disclosure.

In any embodiment, a multilayer blown film may comprise a layer comprising a metallocene polyethylene (mPE) having a high melt index ratio (MIR), a layer comprising a mPE having a low MIR, and a layer comprising the polypropylene resin according to the instant disclosure, also referred to herein as broad molecular weight polypropylene, (BMWPP). The film may comprise greater than or equal to 20 wt % polyethylene, or 30 wt %, or 40 wt %, or 50 wt %, or 60 wt %, or 70 wt %, or 80 wt %, based on the total weight of the film. In any embodiment, the film may comprise greater than or equal to 20 wt % BMWPP according to the instant disclosure, or 30 wt %, or 40 wt %, or 50 wt %, or 60 wt %, or 70 wt %, or 80 wt %, or from 20 wt % to 80 wt %, based on the total weight of the film. In any embodiment, at least one layer of the film may comprise greater than or equal to 20 wt % BMWPP according to the instant disclosure, or 30 wt %, or 40 wt %, or 50 wt %, or 60 wt %, or 70 wt %, or 80 wt %, or from 20 wt % to 80 wt % based on the total weight of the layer of the film.

In any embodiment, the multilayer blown film may comprise at least four distinct layers including a pair of skin layers on opposite surfaces of a sub-laminate assembly of at least two sublayers. For example, the sublayers can comprise a pair of intermediate sublayers on either side of a core sublayer. The skin layers and at least one sublayer comprise a metallocene polyethylene (mPE), hereinafter referred to as the "mPE sublayer(s)," and at least one of the other sublayer(s) comprise the polypropylene resin according to the instant disclosure (BMWPP). The mPE can be the same or different in the skin layers and/or the at least one sublayer. The skin layers independently may comprise low-melt index ratio (MIR), 121.6/12.16, from 15 up to 25, high-MIR mPE (MIR greater than 25 up to 80), or a combination thereof. In another embodiment, the mPE used in the sublayer(s) comprises low-MIR mPE, high-MIR mPE, or a combination thereof. Likewise where a plurality of the sublayers comprising the polypropylene resin according to the instant disclosure (BMWPP) are present, the composition can be the same or different in each of the sublayers.

In any embodiment, the at least one mPE sublayer may comprise at least one pair of intermediate layers on opposite sides of a core sublayer comprising the polypropylene resin according to the instant disclosure. As used herein a "core sublayer" is a dissimilar sublayer sandwiched between a pair of sublayers of the same or similar composition. For example, where the skin layers are designated "S", the mPE sublayers as A and the BMWPP sublayers as B, the film can have the structure S/A/B/A/S, S/A/B/A/B/A/S, and so on. Where the mPE sublayers are spaced apart by the BMWPP core sublayer, the processability of the film is facilitated, e.g., allowing a higher throughput, lower energy or the like, and the mechanical properties are the same or improved, relative to a similar three-layer film without the mPE sublayers. In any embodiment, the at least one BMWPP core sublayer may comprise at least one pair of intermediate layers on opposite sides of a core sublayer comprising the mPE sublayer, e.g., S/B/A/B/S, S/A/B/A/S, S/B/A/B/A/B/S, S/A/B/A/B/A/S or the like. Where the HDPE/LDPE sublayers are spaced apart by the mPE core sublayer, the stiffness of the film is increased, relative to a similar film without the HDPE/LDPE sandwiching structure.

Where both intermediate and core sublayers are present, the intermediate sublayers may be from 0.5 to 2 times as thick as one of the skin layers, and the core sublayer(s) may be from 0.5 to 6 times as thick as one of the intermediate layers. In any embodiment, the intermediate and core sublayers may be at least as thick as or thicker than the skin layers. For example, in a five-layer film the relative thickness ratios (skin layer/intermediate sublayer/core sublayer/intermediate sublayer/skin layer) can be 1/1/1/1/1, 1/1/4/1/1, 1/1/6/1/1, 1/2/2/2/1, 1/2/4/2/1, or the like. The skin layers can have the same or different thickness from 2 μm to 40 μm (0.08 to 1.6 mils). The overall thickness of the blown film can range from 20 μm to 400 μm (0.8 to 16 mils).

For increasing production rate, the skin layers independently may comprise the low-MIR mPE, and the sublayers comprise intermediate sublayers of the high-MIR mPE, and a core sublayer of BMWPP. The skin layer may comprise up to 95 percent by weight of another polymer selected from the group consisting of: LDPE, differentiated polyethylene (DPE) and combinations thereof. The multilayer film may comprises, relative to a 3-layer reference film, (A) the same or higher machine direction (MD) tensile at break, MD 1% secant modulus and puncture resistance (maximum force), and (B) substantially higher MD elongation at break, transverse direction (TD) tensile at break and MD Elmendorf tear strength. The reference film has a core having the same composition and thickness as the multilayer film core, and skin layers having the same composition as the multilayer film skin layers and the same thickness as the combined thickness of one of the multilayer film skin layers and one of the intermediate layers. As used herein, a property of the multilayer film is the same as the same property of the reference film if the multilayer film property is within 15% of the reference film property; and substantially higher if the multilayer film property is more than 20% of the reference film property, in the same units.

For collation shrink applications, the multilayer blown film independently may comprise low-MIR mPE skin layers, high-MIR mPE intermediate sublayers and a BMWPP core sublayer. The skin layers may comprise up to 80 percent by weight of another polymer selected from the group consisting of HDPE, LDPE and combinations thereof, and the core sublayer may comprise BMWPP and LDPE at a ratio from 1:10 to 10:1 by weight. The multilayer film may comprises, relative to a 3-layer reference film, (A) the same or higher MD tensile at break and MD elongation at break and puncture resistance (maximum force), and (B) substantially higher MD Retramat shrink force and MD 1% secant modulus, wherein the reference film comprises a core and skin layers having the same composition as the multilayer film core and skin layers, respectively, wherein the reference film skin layers are twice as thick as the multilayer film skin layers and wherein the reference film core sublayer is the same thickness as the total thickness of the multilayer film core sublayer plus one of the intermediate layers.

In an embodiment useful for making heavy duty bags, the multilayer blown film independently may comprise mPE skin layers selected from low-MIR mPE, high-MIR mPE and combinations thereof, BMWPP intermediate sublayers and an mPE core sublayer selected from low-MIR mPE, high-MIR mPE and combinations thereof. In another embodiment, the multilayer blown film independently comprises high-MIR mPE skin layers, BMWPP intermediate sublayers and a low-MIR mPE core sublayer. In any embodiment, the multilayer film may comprise, relative to a 3-layer reference film, (A) the same or higher MD 1% secant modulus and Dart impact strength, and (B) higher MD tensile strength at break, MD bending stiffness, puncture force and creep at 50° C. and 1 kg, wherein the reference film comprises the same skin layer composition as the multilayer film, wherein the reference film core sublayer comprises a 60-40 blend by weight of the HDPE in the intermediate sublayers and the mPE in the multilayer film core sublayer, wherein the overall thickness of the reference film is the same as the multilayer film, and wherein the reference film skin layers are each one-third the thickness of the reference film core sublayer.

In an embodiment useful for laminating film applications, the multilayer blown film independently comprises mPE skin layers comprising the low-MIR mPE and the high-MIR mPE at a ratio from 1:10 to 10:1 by weight, BMWPP intermediate sublayers and a high-MIR mPE core sublayer. In another embodiment, the BMWPP intermediate sublayers further comprise up to 90 percent by weight of another propylene-based polymer. In an embodiment, the multilayer film comprises, relative to a 3-layer reference film, (A) the same or higher MD tensile strength at break, and (B) substantially higher TD 1% secant modulus and MD 1% secant modulus, wherein the reference film has skin layers comprising an 85-15 blend by weight of the same low-MIR mPE and the same high-MIR mPE as the multilayer film skin layers, and has a core sublayer of the same high-MIR mPE as the multilayer film core sublayer, wherein each of the skin layers in the reference film are one-half the thickness of the reference film core sublayer, and wherein the overall thickness of the reference film is the same as the multilayer film.

In any embodiment, respective melt streams may be supplied to a multilayer blown film extruder die, and coextruded to form a blown film comprising inner and outer skin layers and a plurality of sublayers. The skin layers may comprise an mPE selected from low-MIR mPE, high-MIR mPE or a combination thereof, wherein at least one of the sublayers comprises mPE, and wherein at least one of the sublayers comprises BMWPP. The draw-down ratio (DDR) and blow-up ratio (BUR) at the bubble are controlled at a DDR from 1 to 500 and a BUR from 1.2 to 4.5, and the film is cooled adjacent the bubble to maintain a freeze-line distance from the die between 1.5 times the die diameter and 5 times the die diameter.

In any embodiment, the sublayer mPE may comprise low-MIR mPE, high-MIR mPE, or a combination thereof, and in a further embodiment, the at least one mPE sublayer comprises a pair of intermediate sublayers on opposite sides of a core sublayer comprising the at least one sublayer comprising the BMWPP. The intermediate layers may be from 0.5 to 2 times as thick as one of the skin layers and wherein the core sublayer is from 0.5 to 6 times as thick as one of the intermediate layers. The skin layers independently may comprise the low-MIR mPE; the sublayer mPE may comprise high-MIR mPE and the at least one mPE sublayer may comprise a pair of intermediate layers on opposite sides of a core sublayer comprising the at least one sublayer comprising BMWPP; and the core sublayer may comprise LDPE.

Multilayer blown films may be made in a high-stalk extrusion process, wherein a plurality of extruders feed melt streams to a stack die, which forms an inflated bubble extending to a guide tent where the tubular, blown film is taken up at nip rolls, from which a webbing is wound onto windup roll. Typical melt temperatures are from 175° C. to 225° C., as disclosed in US 2012/0100356. In such a process, melt streams are fed through a gap (typically 30-50 µm) in an annular die and forms a tube of molten polymer which is moved vertically upward. The initial diameter of the molten tube is approximately the same as that of the annular die. Pressurized air is fed to the interior of the tube to maintain a constant air volume inside a bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 13 to 51 µm (0.5 to 2 mils) and by a development of biaxial orientation in the film. The expanded tube is rapidly cooled (which induces crystallization of the polymer), collapsed between a pair of nip rolls and wound onto a film roll. The film can be axially slit and unfolded to form a flat film, or otherwise subjected to a desired auxiliary process, such as treating, sealing, or printing.

Two factors are useful to determine the suitability of a particular polyolefin resin or blend for high stalk extrusion: the maximum attainable rate of film manufacture and mechanical properties of the formed film. Adequate processing stability for thin gauge manufacture on modern multilayer extrusion equipment is desired at high line speeds (>61 m/min (200 ft/min)) and throughput rates from 0.9 to 2.7 kilograms per hour per centimeter (5 to 30 lbs per hour per inch) of die circumference. The films produced as described herein have characteristics which allow them to be processed successfully at these high speeds. In an embodiment, the use of the BMWPP, and/or high-MIR mPE as sublayers results in a higher achievable throughput rates than comparable films without these sublayers.

LDPE may be prepared in high pressure polymerization using free radical initiators, and typically has a density in the range of 0.915-0.935 g/cm$^3$. LDPE is also known as "branched" or "heterogeneously branched" polyethylene because of the relatively large number of long chain branches extending from the main polymer backbone. Polyethylene in similar density range, i.e., 0.910 to 0.945 g/cm$^3$, which is linear and does not contain long chain branching is known as "linear low density polyethylene" (LLDPE), and can be produced with conventional Ziegler-Natta catalysts, vanadium catalysts, or with metallocene catalysts in gas phase reactors and/or with metallocene catalysts in slurry reactors and/or with any of the disclosed catalysts in solution reactors. The LLDPE reaction systems are relatively low pressure reactor systems. LLDPE known in the art and not prepared with a single-site catalyst, i.e., non-metallocene LLDPE, is referred to herein as "traditional LLDPE."

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal (M). A metallocene catalyst is considered a single site catalyst. Metallocene catalysts generally require activation with a suitable co-catalyst, or activator, in order to yield an active metallocene catalyst, i.e., an organometallic complex with a vacant coordination site that can coordinate, insert, and polymerize olefins. Active catalyst systems generally include not only the metallocene complex, but also an activator, such as an alumoxane or a derivative thereof such as alkylalumoxane, an ionizing activator, a Lewis acid, or a combination thereof. Methyl alumoxane and modified methylalumoxanes are particularly suitable as catalyst activators.

Resins produced using a single-site catalyst, may be identified by the use of an initial lower case "m," e.g., mPE encompasses any metallocene-catalyzed LLDPE. As used herein, the term "metallocene catalyzed polymer" refers to any polymer, copolymer, or terpolymer, and, in particular, any polyolefin polymerized using a single-site catalyst and is used interchangeably with the term "single-site catalyzed polymer," wherein both "metallocene catalyzed polymer" and "single-site catalyzed polymer" are meant to include non-metallocene catalyzed single-site catalyzed polymers. As used herein, the term "Ziegler-Nana catalyzed polymer" refers to any polymer, copolymer, or terpolymer, and, in particular, any polyolefin polymerized using a conventional Ziegler-Natta catalyst.

Metallocene polyethylene (mPE) is thus an LLDPE homopolymer or copolymer prepared using a single-site catalyst and has a density of from 0.910 to 0.945 g/cm$^3$ and a melt index (MI), $I_{2.16}$, from 0.1 to 15 g/10 min. As used herein, mPE having an MI ratio (MIR), $I_{21.6}/I_{2.16}$, greater than 25 up to 80, or from 28 to 80 is referred to as a "high-MIR mPE," whereas "low-MIR mPE" has an MIR from 15 up to 25, or from 15 to 20, most commonly from 16 to 18. In an embodiment, the low-MIR mPE has a density of from 0.910 to 0.930 g/cm³. In an embodiment, the high-MIR mPEs exhibit a melt index ratio according to the following formula: ln(MIR)=−18.20−0.2634 ln(MI,12.16)+23.58* [density, g/cm³]. High-MIR mPEs can be prepared using the conditions of published application US 2007-2260016, incorporated herein by reference in its entirety. Briefly, to obtain a desired MIR, both the molar ratio of ethylene and comonomer and the concentration of the comonomer may be varied. Control of the temperature can help control the MI. Overall monomer partial pressures may be used which correspond to conventional practice for gas phase polymerization of LLDPE.

In any embodiment, the mPE may be a copolymer of ethylene and at least one other alpha-olefin, such as $C_3$ to $C_{20}$ alpha-olefins, or $C_3$ to $C_{10}$ alpha-olefins, or $C_3$ to $C_8$ alpha-olefins, which may be linear or branched or a combination of two or more alpha-olefins. Composition distribution breadth index (CDBI) is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is temperature rising elution fraction (TREF), as described in Wild, et al., J. Poly. Sci., Poly. Phys. Ed., Vol. 20, p. 441 (1982) and U.S. Pat. No. 5,008,204, which are hereby incorporated herein by reference in their entirety.

The mPEs generally have a high stiffness and high impact strength, and the high-MIR mPEs also have good shear thinning and therefore relatively favorable extrusion and other melt processing properties. In comparison to LDPE made in a high pressure process and having a comparable density and MI, the high-MIR mPEs have a favorable DIS-modulus balance, e.g., a DIS that is consistent with that predicted by formula (B) above. In comparison with low-MIR mPE and traditional LLDPE, the high-MIR mPEs have improved shear thinning, a higher CDBI and a higher DIS. Further, high-MIR mPEs exhibit superior puncture force when compared to traditional LLDPEs.

A representative commercial example of a low-MIR mPE is EXCEED™ polymer (made by ExxonMobil Chemical Company) produced in a gas phase process using metallocene-based supported catalysts. An example of a high-MIR mPE includes ENABLE™ polymer (made by ExxonMobil Chemical Company) produced in a gas phase process using metallocene-based supported catalysts. As between the high-MIR and low-MIR mPEs, the high-MIR mPEs have a better shear thinning behavior and comparable other properties.

Very low density polyethylene (VLDPE) is generally similar to LLDPE in terms of composition, MWD, CDBI, etc., and can be produced by a number of different processes yielding polymers with different properties, but are generally described as polyethylenes having a density typically from 0.890 or 0.900 g/cm³ to less than 0.910 or 0.915 g/cm³. Relatively higher density linear polyethylene, typically in the range of above 0.930 to 0.945 g/cm³, while often considered to be within the scope of low density polyethylene, is also sometimes referred to as "medium density polyethylene" (MDPE). MDPE can be made in any of the above processes with each of the disclosed catalyst systems and, additionally, chrome catalyst systems. Polyethylene having a still greater density is referred to as "high density polyethylene" (HDPE), i.e., polyethylene having a density greater than 0.945 g/cm³. HDPE is typically prepared with either Ziegler-Natta or chromium-based catalysts in slurry reactors, gas phase reactors, or solution reactors. "Medium-high molecular weight HDPE" is hereinafter defined as HDPE having an MI ranging from 0.1 g/10 min to 1.0 g/10 min.

A further class of polyethylene polymers is "differentiated polyethylene" (DPE). Differentiated polyethylenes are defined herein as those polyethylene polymers that comprise polar comonomers or termonomers. Polymers having more than two types of monomers, such as terpolymers, are also included within the term "copolymer" as used herein. Typical DPEs are well known in the art and include, but are not limited to, ethylene polymers comprising ethylene n-butyl acrylate, ethylene methyl acrylate acrylic acid terpolymers, ethylene acrylic acid, ethylene methyl acrylate, zinc or sodium neutralized ethylene acrylic acid copolymers, ethylene vinyl acetate, and combinations of the foregoing.

In any embodiment, polypropylene based polymers (PP) other than the BMWPP according to the instant disclosure include any polymer comprising at least 50 percent by weight of interpolymerized propylene, such as propylene ethylene copolymers, oriented polypropylene, amorphous polypropylene, or the like. VISTAMAXX™ propylene based elastomers available from ExxonMobil Chemical Company is a representative example of an alternative polypropylene-based polymer.

Nothing with regard to these definitions is intended to be contrary to the generic definitions of these resins that are well known in the art. It should be noted, however, that mPE may refer to a blend of more than one mPE grade/type. Similarly, LLDPE may refer to a blend of more than one LLDPE grade/type, HDPE may refer to a blend of more than one HDPE grade/type, LDPE may refer to a blend of more than one LDPE grade/type, BMWPP may refer to a blend of more than one BMWPP grade/type, and the like. Generally, suitable ethylene polymers and copolymers that are useful according to the instant disclosure include those sold by ExxonMobil Chemical Company in Houston Tex., including those sold as ExxonMobil HDPE, ExxonMobil LLDPE, and ExxonMobil LDPE; and those sold under the EXACT™, EXCEED™ ESCORENE™ EXXCO™ ESCOR™ ENABLE™ NTX™, PAXON™, and OPTEMA™ trade names.

In any embodiment, compositions may include a blend of an LDPE polymer and BMWPP. The blend can further include any mPE described herein, or, a metallocene-catalyzed LLDPE polymer, or a gas-phase produced metallocene-catalyzed LLDPE polymer. The blends can include any of the BMWPP polymers described herein. In an embodiment, the blends include at least 0.1 wt % and up to 99.9 wt % of the LLDPE polymer, and at least 0.1 wt % and up to 99.9 wt % of the BMWPP polymer, with these wt % based on the total weight of the LLDPE and BMWPP polymers of the blend. Alternative lower limits of the LLDPE polymer can be 5%, 10%, 20%, 30% or 40% by weight. Alternative upper limits of the LLDPE polymer can be 95%, 90%, 80%, 70%, and 60% by weight. Ranges from any lower limit to any upper limit are within the scope of the invention. Suitable blends include from 5-85%, alternatively from 10-50% or from 10-30% by weight of the mPE polymer. The balance of the weight percentage is the weight of the BMWPP/LDPE polymer component(s).

In any embodiment, compositions may include a blend of a high-MIR mPE and a low-MIR mPE, which include mLLDPE polymers, or gas-phase produced mLLDPE polymer. The blend can further include any BMWPP and/or any LDPE described herein. The blends include at least 0.1 wt % and up to 99.9 wt % of the high-MIR mPE polymer, and at least 0.1 wt % and up to 99.9 wt % of the low-MIR mPE polymer, with these wt % based on the total weight of the high-MIR mPE and low-MIR mPE polymers of the blend. Alternative lower limits of the high-MIR mPE and/or low-MIR mPE polymers can be 5%, 10%, 20%, 30% or 40% by weight. Alternative upper limits of the high-MIR mPE and/or low-MIR mPE polymers can be 95%, 90%, 80%, 70%, and 60% by weight. Ranges from any lower limit to any upper limit are within the scope of the invention. Suitable blends include from 5-85%, alternatively from 10-50% or from 10-30% by weight of the BMWPP polymer component. The balance of the weight percentage is the weight of the high-MIR mPE and/or low-MIR mPE polymer.

The LDPE polymer, the BMWPP polymer, the high-MIR mPE polymer, the low-MIR mPE polymer, or any two three or all four, can be a single grade of the polymer or to blends of such polymers themselves. For example, the LDPE polymer component in a particular layer of the film can itself be a blend of two or more LDPE polymers having the characteristics described herein; alternatively or additionally, the BMWPP polymer component of in a particular layer of the film can itself be a blend of two or more BMWPP polymers having the characteristics described herein; alternatively or additionally, the high-MIR mPE polymer component in a particular layer of the film can itself be a blend of two or more high-MIR mPE polymers having the characteristics described herein; and alternatively or additionally, the low-MIR mPE polymer component in a particular layer of the film can itself be a blend of two or more low-MIR mPE polymers as described herein.

The film layers described herein can optionally comprise an MDPE polymer, e.g., as a separate layer or blended in the composition of the LDPE, BMWPP and/or mPE layers. The MDPE may be an mMDPE, including those produced in gas phase, slurry, and/or solution processes. When present as a blend, the blends include at least 0.1 wt % and up to 99.9 wt % of the MDPE polymer, by weight of the polymers in the layer. Alternative lower limits of the MDPE polymer can be 5%, 10%, 20%, 30%, or 40% by weight. Alternative upper limits of the MDPE polymer can be 95%, 90%, 80%, 70%, and 60% by weight. Ranges from any lower limit to any upper limit are within the scope of the invention. Suitable blends include from 5-85%, alternatively from 10-50% or from 10-30% by weight of the MDPE polymer. The balance of the weight percentage is the weight of the LDPE, BMWPP and/or mPE polymer components in the layer.

The film layers described herein can optionally comprise a VLDPE polymer, e.g., as a separate layer or blended in the composition of the LDPE, BMWPP and/or mPE layers. The VLDPE may include an mVLDPE, including those produced in gas phase, slurry, and/or solution processes. When present as a blend, the blends include at least 0.1 weight percent and up to 99.9 wt % of the VLDPE polymer, by weight of the polymers in the layer. Alternative lower limits of the VLDPE polymer can be 5%, 10%, 20%, 30%, or 40% by weight. Alternative upper limits of the VLDPE polymer can be 95%, 90%, 80%, 70%, and 60% by weight. Ranges from any lower limit to any upper limit are within the scope of the invention. Suitable blends include from 5-85%, alternatively from 10-50% or from 10-30% by weight of the VLDPE polymer. The balance of the weight percentage is the weight of the LDPE, BMWPP, and/or mPE polymer components in the layer.

The film layers described herein can optionally comprise a DPE polymer, e.g., as a separate layer or blended in the composition of the LDPE, BMWPP, and/or mPE layers. Exemplary DPEs suitable for use in the blends include, but are not limited to, ethylene n-butyl acrylate, ethylene methyl acrylate acid terpolymers, ethylene acrylic acid, ethyl methyl acrylate, zinc or sodium neutralized ethylene acid copolymers, ethylene vinyl acetate, and combinations of the foregoing. When present as a blend, the blends include at least 0.1 wt % and up to 99.9 wt % of the DPE polymer, by weight of the polymers in the layer. Alternative lower limits of the DPE polymer can be 5%, 10%, 20%, 30%, or 40% by weight. Alternative upper limits of the DPE polymer can be 95%, 90%, 80%, 70%, and 60% by weight. Ranges from any lower limit to any upper limit are within the scope of the invention. Suitable blends include from 5-85%, alternatively from 10-50% or from 10-30% by weight of the DPE polymer. The balance of the weight percentage is the weight of the LDPE, BMWPP and/or mPE polymer components in the layer.

One or both of the skin layers may comprise a tackifier such as polybutenes, terpene resins, aliphatic and aromatic hydrocarbon resins, alkali metal and glycerol stearates and hydrogenated rosins. The presence of a tackifier can enhance adhesion, e.g., where the film is used in a cling wrap application.

Multilayer films comprising mPE skin layers, at least one mPE sublayer and at least one BMWPP sublayer, may be formed by methods and processing equipment that are generally well known in the art. The total thickness of multilayer films may vary based upon the application desired. A total film thickness of 5-100 μm, more typically 10-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly in a blown film process to yield a film with four or more layers adhered together but differing in composition. Exemplary multilayer films have at least four or at least five layers. In an embodiment, the multilayer films are composed of five layers.

When used in multilayer films, the mPE or blend comprising the mPE blends may be used in the skin layers and at least one sublayer of the film, or in more than one sublayer of the film, and the BMWPP polymer or blend is used in at least one sublayer. Each such mPE and/or BMWPP layer or sublayer can be individually formulated; i.e., the layers formed of a polymer blend can be the same or different chemical composition, density, melt index, thickness, etc., depending upon the desired properties of the film.

To facilitate discussion of different film structures, the following notation is used to herein. Each layer of a film is denoted A, A1, A2, B, or C, where A indicates an mPE film layer, A1 a low-MIR mPE film layer, A2 a high-MIR mPE film layer, B an LDPE film layer and C a BMWPP film layer, according to the notation previously described herein.

The A layer can be formed of any mPE material and optionally a blend polyethylene known in the art for use in blown films. Thus, for example, the A layer can be formed of an mLLDPE blend with another polyethylene such as, for example, a VLDPE, an LDPE, an MDPE, an HDPE, or a DPE, as well as other polyethylenes known in the art.

Further, the A layer can be a blend of two or more such mPE polymers and/or two or more such other polyethylenes, and can include additives known in the art. In an embodiment, the A layer contains less than 1 percent of additives by weight of the A layer, i.e., the A layer is essentially free of additives. Further, one skilled in the art will understand that the layers of a multilayer film must have the appropriate viscosity match.

The B layer can be any one LDPE or a blend of LDPE and another blend polyethylene known in the art for use in blown films. Thus, for example, the B layer can be formed of an LDPE blend with another polyethylene such as, for example, a VLDPE, an MDPE, an HDPE, or a DPE, as well as other polyethylenes known in the art. Further, the B layer can be a blend of two or more such LDPE polymers and/or two or more such other polyethylenes, and can include additives known in the art. In an embodiment, the B layer contains less than 1 percent of additives by weight of the B layer, i.e., the B layer is essentially free of additives.

The C layer can be any one BMWPP according to any one or combination of embodiments disclosed herein, or a blend comprising the BMWPP and one or more additional poly-alphaolefins known in the art for use in blown films. Thus, for example, the C layer can be formed of BMWPP with another polyethylene such as, for example, a VLDPE, an HDPE, an LDPE, an MDPE, and/or a DPE, as well as other polyethylenes known in the art. Further, the C layer can be a blend of two or more such BMWPP polymers and/or two or more such other polyethylenes, and can include additives known in the art. In an embodiment, the C layer contains less than 1 percent of additives by weight of the C layer, i.e., the C layer is essentially free of additives.

One or more A, B, or C sublayers can also function as an adhesion-promoting tie layer, or an additional layer in addition to the A, B, and/or C sublayers, by including a DPE such as PRIMACOR™ ethylene-acrylic acid copolymers available from The Dow Chemical Co., and/or ethylene-vinyl acetate copolymers. Other materials for tie layers can be any material that can be coextruded in or with a blown film line, for example, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and the like.

Using the nomenclature described above, multilayer films may be produced with any of the following exemplary structures: (a) four-layer films, such as A1/A'/C/A1, A1/A'/A"C/A1, A1/B/C/A1, A1/B/A"C/A1, A2/B/C/A2, A2/B/A"C/A2, A2/B/C/A2, A2/B/A"C/A2, A1/A'/BC/A1, A2/A'/BC/A2, A1A2/A'/C/A1A2, A1A2/A'/A"C/A1A2, AB/A'B'/C/AB, A/C/A'/AB', A/AC/B'/A', A1A2/C/A'/A1A2, A/AC/B'/AB" and A2C/A/B'/A2C', and the like; (b) five-layer films, such as A1/B/CA2/B/A1, A1/C/A2/C/A1, A2/C/A2'/C/A2, A2/BC/A2'/C/A2, A1/B/CA1'/B/A1, A1/C/A1'/C/A1, A2/C/A1/B/A2, A2/C/A1/C/A2, A1A2/B/A1'/C/A1A2, A1A2/C/A1'/C/A1A2, A2B/A1/C'/A1/A2B, A2B/A1/C'C/A1/A2B, A2C/A1/BC'/A1/A2C, and the like; and similar structures for films having six, seven, eight, nine, twenty-four, forty-eight, sixty-four, one hundred, or any other number of layers. It should be appreciated that films having still more layers can be formed using the mPE skins, mPE sublayers and BMWPP sublayers, and such films are within the scope of the invention. The thickness of each layer of the film, and of the overall film, is not particularly limited, but is determined according to the desired properties of the film.

Typical film layers have a thickness of from 1 to 1000 μm, more typically from 5 to 100 μm, and an overall thickness of from 10 to 100 μm.

The multilayer blown films in an embodiment take the form of stretch films. Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can include conventional additives, such as cling-enhancing additives such as tackifiers, and non-cling or slip additives, to tailor the slip/cling properties of the film.

It is desirable to maximize the degree to which a stretch film is stretched, as expressed by the percent of elongation of the stretched film relative to the unstretched film, and termed the "stretch ratio." At relatively larger stretch ratios, stretch films impart greater holding force. Further, films which can be used at larger stretch ratios with adequate holding force and film strength offer economic advantages, since less film is required for packaging or bundling.

As stretch film is stretched, a small decrease in the film thickness due to small fluctuations in thickness uniformity can result in a large fluctuation in elongation, giving rise to bands of weaker and more elongated film transverse to the direction of stretching, a defect known as "tiger striping". Thus, it is desirable to have a yield plateau slope large enough to avoid tiger striping over typical thickness variations of, for example, +−5%. For robust operation over a wide range of elongation, and using a wide variety of stretching apparatus, it is desirable to have a broad yield plateau region. In addition, since the extent of elongation correlates inversely with the amount of film that must be used to bundle an article, it is desirable for the film to be stretchable to a large elongation. While in principle the elongation at break is the maximum possible elongation, in practice, the natural draw ratio is a better measure of maximum elongation. Thus, it is desirable to have a large natural draw ratio. Other desirable properties, not illustrated in a stress-elongation curve, include high cling force and good puncture resistance.

The above-described multilayer blown films are particularly suitable for stretch film applications. Films of the invention can exhibit improved properties, such as applicability over a wide range of stretch ratios without suffering from local deformation leading to break, hole formation, tiger striping, or other defects. Stretch films can be provided so that an end user stretches the film upon application to provide a holding force, or can be provided in a pre-stretched condition. Such pre-stretched films, also included within the term "stretch film", are stretched and rolled after extrusion and cooling, and are provided to the end user in a pre-stretched condition, so that the film upon application provides a holding force by applying tension without the need for the end user to further stretch the film.

Additives can be provided in the various film layers, as is well-known in the art. For stretch film applications, an additive such as a tackifier can be used in one or more layers, or the skin layers, to provide a cling force. Suitable tackifiers and other additives are well-known. Suitable tackifiers include any known tackifier effective in providing cling force such as, for example, polybutenes, low molecular weight polyisobutylenes (PIB), polyterpenes, amorphous polypropylene, ethylene vinyl acetate copolymers, microcrystalline wax, alkali metal sulfosuccinates, and mono- and di-glycerides of fatty acids, such as glycerol monostearate, glycerol monooleate, sorbitan monolaurate, sorbitan monopalmitate, sorbitan monostearate and sorbitan monooleate. The tackifier, if used, can be used in any concentration which will impact the desired cling force, typically from 0.1 to 20% tackifier by weight of the layer or from 0.25 to 6.0% tackifier by weight of the layer. The tackifier can be added to both outer skin layers to provide a stretch film having two-sided cling, or in only one outer layer, to provide a stretch film having one-sided cling.

Some multilayer films described herein may also be suited for use in stretch handwrap films. Stretch film handwrap requires a combination of excellent film toughness, especially puncture, MD tear performance, dart drop performance, and a very stiff, i.e., difficult to stretch, film. Film 'stiffness' minimizes the stretch required to provide adequate load holding force to a wrapped load and to prevent further stretching of the film. The film toughness is required because handwrap loads (being wrapped) are typically more irregular and frequently contain greater puncture requirements than typical machine stretch loads. In an embodiment, stretch handwrap films exhibit a Highlight Ultimate stretch force greater than or equal to 334 N (75 pounds), or greater than or equal to 378 N, 445 N, or 556 N (85, 100, or 125 pounds). Further, in an embodiment, the stretch handwrap films exhibit a puncture peak force greater than or equal to 40 N (9 pounds), or greater than or equal to 45 or 50 N (10 or 11 pounds). In an embodiment, the films are downgauged stretch handwrap films.

Films described herein show improved performance and mechanical properties when compared to films previously known in the art. For example, films containing the mPE skin layers and sublayers and at least one BMWPP sublayer have improved shrink properties, better clarity, good seal strength and hot tack performance, increased toughness, and lower coefficient of friction. In addition, such films may also exhibit higher ultimate stretch and typically have better processability when compared with other LLDPE resins and blends.

In an embodiment, the multilayer films are made into bags. Bags include those bag structures and bag applications known to those skilled in the art. Exemplary bags include shipping sacks, trash bags and liners, industrial liners, produce bags, and heavy duty bags. Heavy duty bags are prepared by techniques known to those skilled in the art, such as for example, vertical form fill and seal equipment. Exemplary conventional heavy duty bags and the apparatus utilized to prepare them are disclosed in US 2006/0188678 and U.S. Pat. Nos. 4,571,926; 4,532,753; 4,532,752; 4,589,247; 4,506,494; and 4,103,473.

In an embodiment, the films are utilized in packaging applications. Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers and various like goods normally containerized and/or palletized for shipping, storage, and/or display.

EXAMPLES

The following ASTM test methods in Table 1 and described below were utilized for the physical property measurements.

TABLE 1a

Polypropylene Test Methods

| PROPERTY | ASTM METHOD |
| --- | --- |
| Melt Flow Rate (g/10 min) | D 1238, Condition L |
| 1% Secant Flexural Modulus, MPa (psi) | D 790 A |
| Tensile strength at Yield, MPa (psi) | D 638 |
| Elongation at Yield (%) | D 638 |
| Elongation at Break (%) | D 638 |
| Notched Izod Impact Strength J/m (ft-lbs/in) | D 256 |
| Heat Distortion Temperature (HDT) @ 66 psi load (° C.) | D 648 |
| Rockwell Hardness, R-Scale | D 785 |
| Gloss at 60° | D 523 |

TABLE 1b

PE resin and film test methods

| PROPERTY (RESIN) | ASTM METHOD |
| --- | --- |
| Melt Flow Rate (g/10 min) | D 1238 |
| Density (g/cm3) | ExxonMobil Internal |
| PROPERTY (FILM) | INDUSTRYMETHOD |
| Secant Modulus<br>1% Secant, MD<br>1% Secant, TD | ASTM D882 |
| Tensile Strength<br>MD: Break<br>TD: Break | ASTM D882 |
| Tensile Elongation<br>MD: Break<br>TD: Break | ASTM D882 |
| Dart Drop Impact | ASTM D1709A |
| Elmendorf Tear Strength<br>MD | ASTM D1922 |
| TD | ASTM D882 |

For purposes herein, Melt Flow Rate (MFR) is measured as per ASTM D1238, condition L, at 230° C. and 2.16 kg load using a melt indexer. The flexural modulus is measured according to ASTM D790A, using a crosshead speed of 1.27 mm/min (0.05 in/min), and a support span of 50.8 mm (2.0 in) using an Instron machine; The tensile strength at yield, elongation at yield and elongation at break were measured as per ASTM D638, with a crosshead speed of 50.8 mm/min (2.0 in/min), and a gauge length of 50.8 mm (2.0 in), using an Instron Machine; the Notched Izod impact strength is measured as per ASTM D256 at room temperature (21° C.), using an equipment made by Empire Technologies Inc.; the Heat Distortion Temperature (HDT) is measured according to ASTM D648, using a load of 0.45 MPa (66 psi); and the polydispersity index (PI) is obtained from oscillatory shear data, from the cross-over modulus and frequency as measured at 190° C. as described in Zeichner G R, Patel P D (1981), "*A comprehensive study of polypropylene melt rheology*"; Proceedings of the 2nd World Congress of Chemical Engineering, Montreal, Canada.

Example 1 was produced in a pilot plant conditions, in a continuous stirred tank reactor (CSTR). The magnesium chloride supported titanium catalyst sold commercially as Avant ZN-168M is utilized with an external donor blend of propyltriethoxysilane and dicyclopentyldimethoxysilane. The catalyst composition preparation is carried out continuously in situ by contacting the catalyst solids, triethylaluminum, and the external electron donor system under the conditions known in the art to yield active, stereospecific catalyst for polymerization of propylene. The activated catalyst was continuously fed to a prepolymerization reactor where it was polymerized in propylene to a productivity of approximately 100 to 300 g-polymer/g-cat. The prepolymerized catalyst was then continuously fed to a continuously stirred tank reactor and polymerization continued at a reactor temperature of 70° C. to yield homopolymer. The hydrogen (chain transfer agent) concentration used in the reactor as show in Table 2. The reactor slurry was continuously removed from the polymerization reactor and the homopolymer granules are continuously separated from the liquid propylene. The granules were passed through a dryer to remove the residual monomer and collected in Gaylord boxes. Examples 2-7 were produced in the same way with varying hydrogen levels in the reactor to achieve the desired melt flow rate (MFR).

The homopolymer granules from the reactor were stabilized with 0.090 wt % Irganox™ 1010, 0.045 wt % Ultranox™ 626A, and 0.10 wt % sodium benzoate (fine form), and pelletized on a twin screw extruder (Werner Pfliederer 30 mm). The pellets were then injection molded using ASTM test specimens and the physical properties tested as per ASTM guidelines.

The films according to the instant disclosure were compared to essentially identical films in which the high density polyethylene of an inner layer was replaced with the inventive polypropylene. The physical properties of the HDPE, labeled Comparative Example 3, are shown in Table 4.

TABLE 4

Comparative Example 3 (Commercial HDPE, ExxonMobil ™ HDPE HTA 108)

| | Nominal Value | Unit | Test Method |
|---|---|---|---|
| Physical | | | |
| Melt Mass-Flow Rate (MFR) | | | ASTM D1238 |
| 190° C./2.16 kg | 0.7 | g/10 min | |
| 190° C./21.6 kg | 46 | g/10 min | |
| Density | 0.961 | g/cm$^3$ | ExxonMobil method |

TABLE 2

Data on polypropylene homopolymers

| Property | Ex. 1 | Ex. 2 | Ex. 3 | Ex. 4 | Ex. 5 | Ex. 6 | Ex. 7 |
|---|---|---|---|---|---|---|---|
| MFR (g/10 min) | 0.9 | 1.0 | 1.4 | 11.7 | 15.6 | 37.8 | 63.4 |
| MWD (PI) | 7.6 | 7.8 | 8.3 | 8.3 | 8.3 | 8.2 | — |
| Tensile at Yield MPa (psi) | 40 (5858) | 39 (5718) | 41 (5893) | 42 (6111) | 43 (6185) | 43 (6200) | 41 (5942) |
| 1% Sec Flex Modulus MPa (kpsi) | 2200 (319) | 2048 (297) | 2276 (330) | 2386 (346) | 2413 (350) | 2428 (352) | 2407 (349) |
| HDT (° C.) | 124 | 125 | 125 | 128 | 127 | 128 | 128 |
| Room Temp. Notched Izod J/m (ft-lbs/in) | 16 (0.3) | 21 (0.4) | 16 (0.3) | 21 (0.4) | 16 (0.3) | 11 (0.2) | 11 (0.2) |
| Rockwell Hardness | 113 | 112 | 113 | 115 | 115 | 116 | 116 |
| Gloss at 60° | 90 | 90 | 90 | 89 | 89 | 89 | 88 |
| Melt Strength (cN) | 43$^2$ | 52$^2$/81 | 30$^3$ | — | — | — | — |
| Viscosity Ratio$^2$ | 66 | 41 | 59 | 15 | 20 | 14 | — |

1. Viscosity ratio - complex viscosity ratio at 0.01/100 angular frequency rad/sec.
$^2$Non-optimized addpack Comparative Example 1 is Borealis Daploy™ WB135HMS, a commercial grade-post reactor grafted polypropylene. Comparative Example 2 is a commercial grade polymer made with methylcyclohexyl dimethoxy silane (MCMS) external donor and a commercial catalyst solids THC-C series supplied by Toho Titanium Co. The data are shown in Table 3.

TABLE 3

Comparative Examples

| Property | Comparative Example 1 | Comparative Example 2 |
|---|---|---|
| MFR (g/10 min) | 2.5 | 2.1 |
| MWD (PI) | — | 4.2 |
| Tensile at Yield MPa (psi) | 48 (6918) | 38 (5530) |
| 1% Sec Flex Modulus MPa (kpsi) | 1986 (288) | 1903 (276) |
| HDT (° C.) | — | 122 |
| Room Temp. Notched Izod J/m (ft-lbs/in) | — | 52 (0.99) |
| Rockwell Hardness | — | — |
| Gloss at 60° | — | — |
| Melt Strength (cN) | 29 | 5 |
| Viscosity Ratio$^1$ | 62 | 15-20 |

$^1$Viscosity ratio - complex viscosity ratio at 0.01/100 angular frequency rad/sec.

TABLE 4-continued

Comparative Example 3 (Commercial HDPE, ExxonMobil ™ HDPE HTA 108)

| | Nominal Value | Unit | Test Method |
|---|---|---|---|
| Films Secant Modulus | | | |
| 1% Secant, MD | 1200 (174000) | MPa (psi) | ASTM D882 |
| 1% Secant, TD | 1700 (247000) | MPa (psi) | |
| Tensile Strength | | | |
| MD: Break | 70 (10200) | MPa (psi) | ASTM D882 |
| TD: Break | 37 (5370) | MPa (psi) | |
| Tensile Elongation | | | |
| MD: Break | 490 | % | ASTM D882 |
| TD: Break | 3 | % | |
| Dart Drop Impact | <20 | g | ASTM D1709A |
| Elmendorf Tear Strength | | | |
| MD | 10 | g | ASTM D1922 |
| TD | 810 | g | |

FIG. 1 shows the branching index g' of Example 2, indicating no evidence of long chain branching. As is known to one of skill in the art, long chain branched polymers have a branching index g' which decreases significantly lower than 1, yet as is shown in FIG. 1, the g' value remains close to 1.

The branching index ($g'_{vis}$, also referred to herein as g') is calculated using the output of the SEC-DRI-LS-VIS method (described in page 37 of U.S. Pat. No. 7,807,769 for g') as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'_{vis} = \frac{[\eta]_{avg}}{kM_v^\alpha}$$

Figure 2:
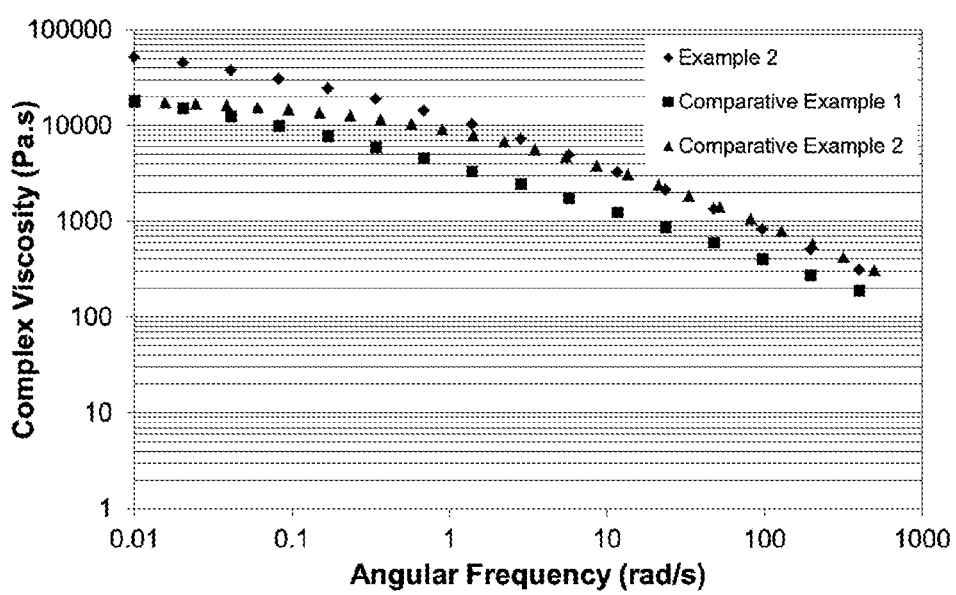
FIG. 2 shows a plot of the complex viscosity vs. the angular frequency of a propylene resin produced according to the instant disclosure.

FIG. 2 shows the complex viscosity vs. angular frequency for Example 2 in comparison to Comparative Examples 8 and 9. All shear/viscosity rheological experiments were conducted with an Anton Paar MCR500 Rheometer equipped with a 25 mm diameter parallel-plate fixture. Disk samples were prepared by compression molding to a thickness of 2.5 mm and diameter of 25 mm. The gap between the two parallel plates was maintained at 1.90 mm for all measurements. Small-amplitude oscillatory shear tests were performed as a function of angular frequency ([omega]) ranging from 0.01 to 500 rad/s at 190° C. A fixed strain of 10% was used to ensure that measurements were carried out within the linear viscoelastic range of the materials investigated.

Gel Analysis on Blown Films

The blown films made from Comparative Example 1 and Example 2 on a Brabender film extrusion line with a thickness of 1.5 mils (0.0015 inches) were evaluated visually for gel defects. The area analyzed is 2×2 inches (5 cm square). The extruder was run at a screw rpm (revolutions per minute) of 60, and with a temperature profile in Zone 1, Zone, 2, Zone 3, Zone 4, and die melt temperatures at 190° C., 270° C., 265° C., 260° C., and 220° C. respectively. The quantification on the gel defects on the two films is shown in Table 5.

TABLE 5

| Property | Comparative Example 1 | Example 2 |
|---|---|---|
| Gels > 500 microns | 40 | 0 |
| Gels < 10 microns | 320 | 0 |

High melt strength property enabled the broad molecular weight distribution polypropylene according to the instant disclosure to be utilized in applications such as blown film, biaxially oriented film, and other related application as illustrated in the following examples. All film samples were produced on a five layer blown film co-extrusion line. The line configuration is shown in Table 6, and the corresponding characterization of the films is shown in Tables 7-12 below. Exceed™ 1018CA (ExxonMobil) is a low-MIR mPE, having a comonomer of hexene, a density of 0.918 g/cm$^3$, a MI of 1, and a MIR of 16. Enable™ 20-05 (ExxonMobil) is a high-MIR mPE, having a comonomer of hexene, a density of 0.920 g/cm$^3$, a MI of 0.5, and a MIR a 4. Comparative HTA™ 108 (ExxonMobil) is a HDPE, having a density of 0.962 g/cm$^3$, a MWD of 5.9, and a MI of 0.7.

TABLE 6

| | Line Configuration | | | |
|---|---|---|---|---|
| | Film | | | |
| | Example 1.1 | Example 1.2 | Comparative Example 3.1 | Comparative Example 3.2 |
| | Description | | | |
| | PP subskin | PP subskin | HDPE subskin | HDPE subskin |
| | Thickness | | | |
| | 40 μm (1.6 mils) | 80 μm (3.2 mils) | 40 μm (1.6 mils) | 80 μm (3.2 mils) |
| Layer 1 Extruder D 50 mm GF | 70% Exceed 1018CA 30% Enable 20-05HH | 70% Exceed 1018CA 30% Enable 20-05HH | 70% Exceed 1018CA 30% Enable 20-05HH | 70% Exceed 1018CA 30% Enable 20-05HH |
| Layer 2 Extruder A 60 mm SB | Inventive PP Example 3 MFR 1.4 | Inventive PP Example 3 MFR 1.4 | Comparative Example 3 HTA 108 | Comparative Example 3 HTA 108 |
| Layer 3 Extruder B 90 mm GF | Exceed 1018CA | Exceed 1018CA | Exceed 1018CA | Exceed 1018CA |
| Layer 4 Extruder C 60 mm GF | Inventive PP Example 3 MFR 1.4 | Inventive PP Example 3 MFR 1.4 | Comparative Example 3 HTA 108 | Comparative Example 3 HTA 108 |
| Layer 5 Extruder E 50 mm GF | 70% Exceed 1018CA 30% Enable 20-05HH | 70% Exceed 1018CA 30% Enable 20-05HH | 70% Exceed 1018CA 30% Enable 20-05HH | 70% Exceed 1018CA 30% Enable 20-05HH |

TABLE 7

Optical Properties

| ASTM D1003 | Example 1.1 | Example 1.2 | Comparative Example 3.1 | Comparative Example 3.2 |
|---|---|---|---|---|
| Total Haze (%) | 8.9 | 16.3 | 9.1 | 19.7 |
| Gloss 45° (%) | 63.9 | 73.8 | 76.4 | 69.4 |

TABLE 8

Tensile Properties Machine Direction

| Tensile properties MD | Example 1.1 | Example 1.2 | Comparative Example 3.1 | Comparative Example 3.2 |
|---|---|---|---|---|
| Thickness (μm/mils) | 40/1.6 | 80/3.2 | 41/1.64 | 81/3.24 |
| 10% offset yield stress (MPa) | 23.3 | 21.7 | 16.9 | 17.5 |
| Elong. @ yield (%) | 7.7 | 8.5 | 7.0 | 9.3 |
| Stress @ yield (MPa) | 23.0 | 21.7 | 16.5 | 17.5 |
| Tensile strength @ break | 82.9 | 61.2 | 65.6 | 54.8 |
| Elong. @ break (%) | 694 | 703 | 716 | 729 |
| Energy @ break (mJ/mm$^3$) | 263 | 204 | 204 | 174 |
| 1% secant modulus (MPa) | 805 | 746 | 498 | 529 |

TABLE 9

Tensile Properties Transverse Direction

| Tensile properties TD | Example 1.1 | Example 1.2 | Comparative Example 3.1 | Comparative Example 3.2 |
|---|---|---|---|---|
| Thickness (μm/mils) | 41/1.64 | 80/3.2 | 42/1.7 | 84/3.4 |
| 10% offset yield stress (MPa) | 20.7 | 21.1 | 17.6 | 17.6 |
| Elong. @ yield (%) | 6.5 | 7.6 | 7.2 | 9.2 |
| Stress @ yield (MPa) | 21.8 | 21.6 | 18.1 | 17.8 |
| Tensile strength @ break | 58.9 | 54.2 | 55.6 | 51.8 |
| Elong. @ break (%) | 711 | 706 | 723 | 738 |
| Energy @ break (mJ/mm$^3$) | 180 | 175 | 162 | 164 |
| 1% secant modulus (MPa) | 731 | 715 | 543 | 530 |

TABLE 10

Elmendorf Tear Strength

| Elmendorf tear strength | Example 1.1 | Example 1.2 | Comparative Example 3.1 | Comparative Example 3.2 |
|---|---|---|---|---|
| MD (g/μm) | 2.2 | 4.6 | 4.2 | 5.2 |
| TD (g/μm) | 13.8 | 13.7 | 16.3 | 14.2 |

TABLE 11

Dart Impact

| Dart impact, AF 50% | Example 1.1 | Example 1.2 | Comparative Example 3.1 | Comparative Example 3.2 |
|---|---|---|---|---|
| Absolute value (g) | 252 | 532 | 232 | 490 |
| Normalized (g/μm) | 6.3 | 6.7 | 5.8 | 6.1 |

For purposes herein the bending stiffness and related properties were measured according to a test method based on DIN 53121: "Bestimmung der Biegesteifigkeit nach der Balkenmethode", modified for use with thin films using test conditions which were experimentally derived. The method is directed to determination of bending stiffness of thin plastic film and/or laminates. Bending stiffness is the resistance against flexure, and is related to the intrinsic stiffness of the material and its thickness. The measurement utilizes the cantilever beam method that measures the force required to flex a strip to a certain angle. In this test the sample is vertically clamped at one end while the force is applied to the free end of the sample normal to its plane (two point bending). A modified two point bending apparatus is mounted on the cross-head of a standard tensile tester and consists of an angular drive part, which translates the cross-head movement directly into flexural movement. The sample is fixed in an upper clamping unit while the free end pushes (upon flexure) against a thin probe (lamella) connected to a sensitive load cell capable of measuring small load values consistent with thin films. By plotting the load against flexure, a so-called "load-flexure curve" is obtained. From this plot, characteristic figures can be calculated which show the characteristics of the bending stiffness properties as are readily known to one having minimal skill in the art. For purposes herein, all tests are performed at room temperature unless otherwise indicated, which means a temperature of 23+/−2° C. and a relative humidity of 50+/−5%. This test can experimentally measure the bending stiffness of monolayer and multiple layer structures.

For purposes herein, bending stiffness maximum force (F max or Force at 30°) is the maximum force required to deflect the test piece to the maximum bending angle which is standard set at 30°. It is a measure of resistance against bending and gives an indication of the stiffness of the film sample and is expressed in mN. The measured value depends on the gauge length setting. Values can only be compared with same gauge length setting. Bending stiffness normalized maximum force (F max normalized, or Bending Stiffness) is F max divided by the thickness of the film sample. It is expressed in mN/μm. Bending force Elastic modulus (Bending Modulus 10°-25°) is calculated as a secant modulus by drawing a straight line through two well defined points on the load-flexure curve, here 10° flexure and 25° flexure. The E-modulus is defined as the slope of this line and should be calculated in an area where load is proportional to flexure (theoretically within the limits of elastic deformation). The Elastic modulus value is an intrinsic property of the material and gives a direct indication of the stiffness. Elastic modulus is calculated as follows: E-mod in MPa=$(4\times\Delta F\times l_0^3)/(\Delta f\times b\times h^3)$, wherein: $\Delta f=\Delta l\times(l_0/r)$, and E-mod in MPa=$(4\times\Delta F\times l_0^2\times r)/\Delta l\times b\times h^3$, wherein: $\Delta F$=difference in load between 10° and 25° in N; $\Delta f$=difference in flexure between 10° and 25° in mm; $\Delta l$=difference in strain between 10° and 25° in mm; $L_0$=sample gauge length in mm; r=radius of the angular drive in mm; b=sample width in mm; and h=sample thickness in mm.

The Stiffness factor (Bending Stiffness) is defined as the moment of resistance per unit width that the film offers to bending. It can be seen as a width related flexural strength and is expressed in N·mm and is mathematically defined as: S=(E×I)/b, wherein: S=Stiffness factor in N·mm; I=The second moment or area moment of inertia; b=The width of the cross-sectional area considered in mm; and E=Modulus of elasticity in MPa. For a flat film specimen, the second moment of inertia is I=$(b\times h^3)/12$, wherein h=film thickness in mm such that: S=$(E\times h^3)/12$.

Accordingly, the bending stiffness of a monolayer film sample is proportional to its elastic modulus times the cube of the film thickness. This stiffness factor can be measured and theoretically calculated from its elastic modulus. This stiffness factor can be used for down-gauging purposes (when comparing bending stiffness of film samples with different thickness). For materials comprising two or more different layers the bending stiffness is a complex function of each layer's modulus, thickness and location (distance from the so-called neutral axis) in the film. Calculation here requires a more complex modelling approach such that only the measured stiffness factor can be used for down-gauging purposes.

For purposes herein: thickness (h) is the measured thickness of the tested film sample expressed in μm; test direction is related to an anisotropy film sample, which needs to be tested in two directions: in machine direction (MD) and transverse direction (TD); specimen width (b) is the nominal width of the tested film sample and is expressed in (mm), the standard setting is 38 mm; and gauge length ($l_0$) is the test length or bending length which is the distance between the clamping position and the thin lamellae and is expressed in (mm).

The smaller the gauge length setting the higher the force and vice versa. Since forces are very small for PE film gauge length should be as small as possible. Gauge length can be set to 1, 2, and 5 mm. Shear effects may invalidate the simple bending theory, to minimize these type of error ratio gauge length/film thickness should be as high as possible. In all cases herein $L_0/h > 9.5$ For purposes herein, film samples up to 50 μm can be tested with $l_0 = 1$ mm, up to 100 μm can be tested with $l_0 = 2$ mm, and up to +/−maximum 500 μm can be tested with $l_0 = 5$ mm.

Testing speed refers to the constant rate of flexure and is expressed in (mm/min) or (°/min). For purposes herein the testing speeds were 30°/min upon reaching the pre-load and 30°/min for the actual test.

Pre-load refers to the load value at which the actual measurement is started and corresponds to starting position of the channel flexure, the standard setting used herein was 5 mN. The pre-load is used to compensate for the so-called TOE region at the origin of the load-flexure curve. This TOE region does not represent a property of the material, but is an artefact caused by a take-up of slack, alignment or seating of the specimen. Upon reaching the pre-load the load value is reset to Zero. Maximum flexure refers to the maximum bending angle, which was 30° for purposes herein.

The bending stiffness of packaging film or laminate affects its machine-ability and functionality in various applications (e.g., VFFS, HFFS, stand-up pouches). The drive toward downgauging means that materials are constantly pushed to the limit where the bending stiffness can become a critical factor. Bending stiffness of embodiments disclosed herein are shown in Table 12.

TABLE 12

Bending Stiffness

| 2-Point Bend Stiffness, modified DIN 53121 | Example 1.1 | Example 1.2 | Comparative Example 3.1 | Comparative Example 3.2 |
|---|---|---|---|---|
| Gauge length (mm) | 1 | 2 | 1 | 2 |
| Thickness (μm/mils) | 40/1.6 | 80/3.2 | 39/1.6 | 83/3.3 |
| Force @ 30° (mN) | 142 | 365 | 86 | 285 |
| Normalized Force @ 30°(mN) | 3.6 | 4.6 | 2.2 | 3.4 |
| Bending Modulus 10°-25° (MPa) | 462 | 623 | 301 | 418 |
| Bending Stiffness (mN · mm) | 2.52 | 26.6 | 1.52 | 19.8 |

As the data shows, a benefit of the broad molecular weight distribution polypropylene in this invention is the higher stiffness (15-25%) than typical polypropylene e.g., polypropylene in Comparative Example 2. The extra stiffness enabled the broad molecular weight distribution polypropylene to participate in selective applications that allow downgauging opportunities while maintaining critical properties. The higher stiffness is shown in the examples where the bending stiffness of coextruded blown films with the broad molecular weight distribution polypropylene in the inner layers enabled 20% downgauging of the overall film structure.

The bending modulus of the inventive Example 1.1 is 53% higher in comparison to the same thickness HDPE base structure, namely Comparative Example 3.1. For the 80 μm structure, Example 1.2, the bending modulus is 49% higher in comparison to the HDPE based structure, Comparative Example 3.2. The bending stiffness for the 40 μm inventive Example 1.1, is 66% higher in comparison to the same thickness HDPE based structure, and it is 34% higher for the 80 μm structure with inventive Example 1.2 in comparison to the HDPE based structure, Comparative Example 3.2. The significant improvement in the bending modulus and stiffness permits one skilled in the art to downgauge structure containing broad MWD polypropylene according to the instant disclosure by more than 20% and still achieve the same or improved end-use properties.

We claim:

1. A film comprising a polypropylene resin, wherein the polypropylene resin comprises at least 50 mol % propylene, an MWD (Mw/Mn) greater than 5, a branching index (g') of at least 0.95, wherein the film is an extruded blown film, a cast film, or a combination thereof, wherein the polypropylene resin is produced by contacting propylene monomers at propylene polymerization conditions with a catalyst system comprising a Ziegler-Natta catalyst comprising a non-aromatic internal electron donor, and first and second external electron donors comprising different organosilicon compounds.

2. The film of claim 1, wherein the polypropylene resin has an MWD from 6 to 15 and an MFR from 0.1 to 100, determined according to ASTM D1238 Condition L.

3. The film of claim 1, wherein the melt strength of the polypropylene resin is at least 20 cN.

4. The film of claim 1, wherein the polypropylene resin has a viscosity ratio of from 35 to 80 determined from the complex viscosity ratio at 0.01 to 100 rad/s angular frequency at a fixed strain of 10% at 190° C.

5. The film of claim 1, wherein the polypropylene resin has a heat distortion temperature of greater than or equal to 100° C., determined according to ASTM D648 using a load of 0.45 MPa (66 psi).

6. The film of claim 1, wherein the polypropylene resin has a stiffness of from 2000 MPa (290 kpsi) to 2500 MPa (360 kpsi) determined according to ASTM D790A on samples nucleated with 0.1% sodium benzoate.

7. The film of claim 1, wherein the polypropylene resin is not treated with peroxide.

8. The film of claim 1, characterized by containing less than 1 total gel having a size of 1 micron or larger, wherein the gel content is determined by optical microscopy at 8× magnification of a 5 cm square of a blown film having a thickness of 38.1 microns (1.5 mils).

9. The film of claim 1, having a tensile strength at break MD determined according to ASTM D882 of greater than 60

MPa, and a tensile strength at break TD determined according to ASTM D882 of greater than 60 MPa for a 40 micron film.

10. The film of claim 1, having an elongation at break MD determined according to ASTM D882 of greater than 650%, and an elongation at break TD determined according to ASTM D882 of greater than 650%, for a 40 micron film.

11. The film of claim 1, having a 1% secant modulus MD determined according to ASTM D882 of greater than 550 MPa, and a 1% secant modulus TD determined according to ASTM D882 of greater than 550 MPa for a 40 micron film.

12. The film of claim 1, having a two point bending stiffness bending modulus at 10°-25° of greater than or equal to 550 MPa, using an 80 micron film determined according to DIN 53121.

13. The film of claim 1, having a two point bending stiffness of greater than or equal to 1.6 mN-mm, determined using a 40 micron film according to DIN 53121.

14. The film of claim 1, having an Elmendorf tear strength in the machine direction (MD) of greater than 2.0 g/μm for a 40 micron film, greater than 4.5 g/μm for an 80 micron film an Elmendorf tear strength in the transverse direction (TD) of greater than 13.5 g/μm for a 40 micron film, greater than 13.5 g/μm for an 80 micron film, or a combination thereof, when determined according to ASTM-D1922.

15. A multilayered film comprising at least one layer formed from the film of claim 1.

* * * * *